United States Patent [19] [11] 4,185,912

Schwartz [45] Jan. 29, 1980

[54] PHOTOGRAPHIC DEVELOPER AND PRINTER

[75] Inventor: Theodore F. Schwartz, 11160 St. Andrews Way, Scottsdale, Ariz. 85251

[73] Assignees: Theodore F. Schwartz, Scottsdale; Lester J. Hayt, Sr., Phoenix; William H. Yost, Sun City, all of Ariz.; Gail M. Hall, Newhall, Calif.; Lester J. Hayt, Jr., Tucson, Ariz.; Nancy J. Hayt; Michelle J. Butts, both of Phoenix, Ariz.; Ray R. Hall, Burbank, Calif.; Gary Hall, Sylmar, Calif.; Philip Hall, Carmichael, Calif.; Caroline Bouher, Phoenix, Ariz.; Hilda Ross, Aurora, Ind.; Howard Ross, Sr., Aurora, Ind.; Howard Ross, Jr., Aurora, Ind.; Marilyn Seal, New Orleans, La.; John D. Ross, Aurora, Ind.; Richard A. Schwartz, Scottsdale, Ariz.; Josette M. Lagardere; Josette Lagardere, both of Springville, Calif.; John R. Lagardere, Lawndale, Calif.; George Newton, Stratford, N.J.; Camilla M. Burnette, Tulsa, Okla.; Emily Jean Troupe, Foster City, Calif.; S. Paul Ferrin; Arthur D. Ehrenreich, both of Phoenix, Ariz.; Robert D. Schwartz; Penny Lee Masterson, both of Scottsdale, Ariz.; Cathy Jo Fischer, Paradise Valley, Ariz.; Cindy Sue Schwartz; Jacquie L. Serrett, both of Scottsdale, Ariz.; Daniel Grubb, Phoenix, Ariz.; Bette M. Gary; Leonard Bronstein, both of Paradise Valley, Ariz.; Theodore S. Toth, Phoenix, Ariz.; Kenneth M. Brown, Torrance, Calif.

[21] Appl. No.: 810,108

[22] Filed: Jun. 27, 1977

[51] Int. Cl.² ............ G03B 27/32; G03D 3/13

[52] U.S. Cl. .................... 355/28; 355/27; 354/308; 354/316; 354/322; 354/324; 226/170
[58] Field of Search ............. 354/298, 308, 309, 310, 354/312, 313, 314, 316, 319, 320, 321, 322, 324, 328, 297; 355/27, 28; 226/170

[56] References Cited

U.S. PATENT DOCUMENTS

| | | | |
|---|---|---|---|
| 2,769,369 | 11/1956 | Oiler | 354/312 |
| 2,909,979 | 10/1959 | Corrons | 354/328 |
| 2,989,911 | 6/1961 | Winnek | 354/323 |
| 3,208,335 | 9/1965 | Doherty | 354/308 |
| 3,314,352 | 4/1967 | Grant | 354/308 |
| 3,623,416 | 6/1968 | Anderberg | 354/324 |
| 3,727,815 | 4/1973 | Schwartz | 226/170 |
| 3,760,705 | 9/1973 | Miller | 354/322 |
| 3,792,487 | 2/1974 | Peres | 354/323 |
| 3,852,793 | 12/1974 | McClintock | 354/324 |
| 3,868,715 | 2/1975 | Slavin | 354/324 |
| 3,988,756 | 10/1976 | Wick et al. | 354/324 |
| 4,012,753 | 3/1977 | Schmidt | 354/321 |
| 4,081,816 | 3/1978 | Geyken et al. | 354/324 |
| 4,101,919 | 7/1978 | Ammann | 354/324 |

*Primary Examiner*—L. T. Hix
*Assistant Examiner*—Alan Mathews
*Attorney, Agent, or Firm*—Don J. Flickinger

[57] ABSTRACT

The disclosure relates to a compact photograph developer and printer which is contained in a cabinet adapted to receive exposed film and to deliver printed pictures therefrom. The photograph developer and printer being adapted for use in public places and being fully automatic upon the insertion of exposed film therein to process the film, expose it and print photographs which are automatically delivered through a light trap opening in the housing to the operator. The housing contains novel film transport means including an adhesive film transport tape adhesively engageable with the marginal edges of film beyond the picture area thereof for pulling the film through the developer and processing tanks as well as the dryer. The machine also contains an exposing and printing facility as well as a print paper processing and developing tank means, all contained in the housing in light tight conditions.

17 Claims, 31 Drawing Figures

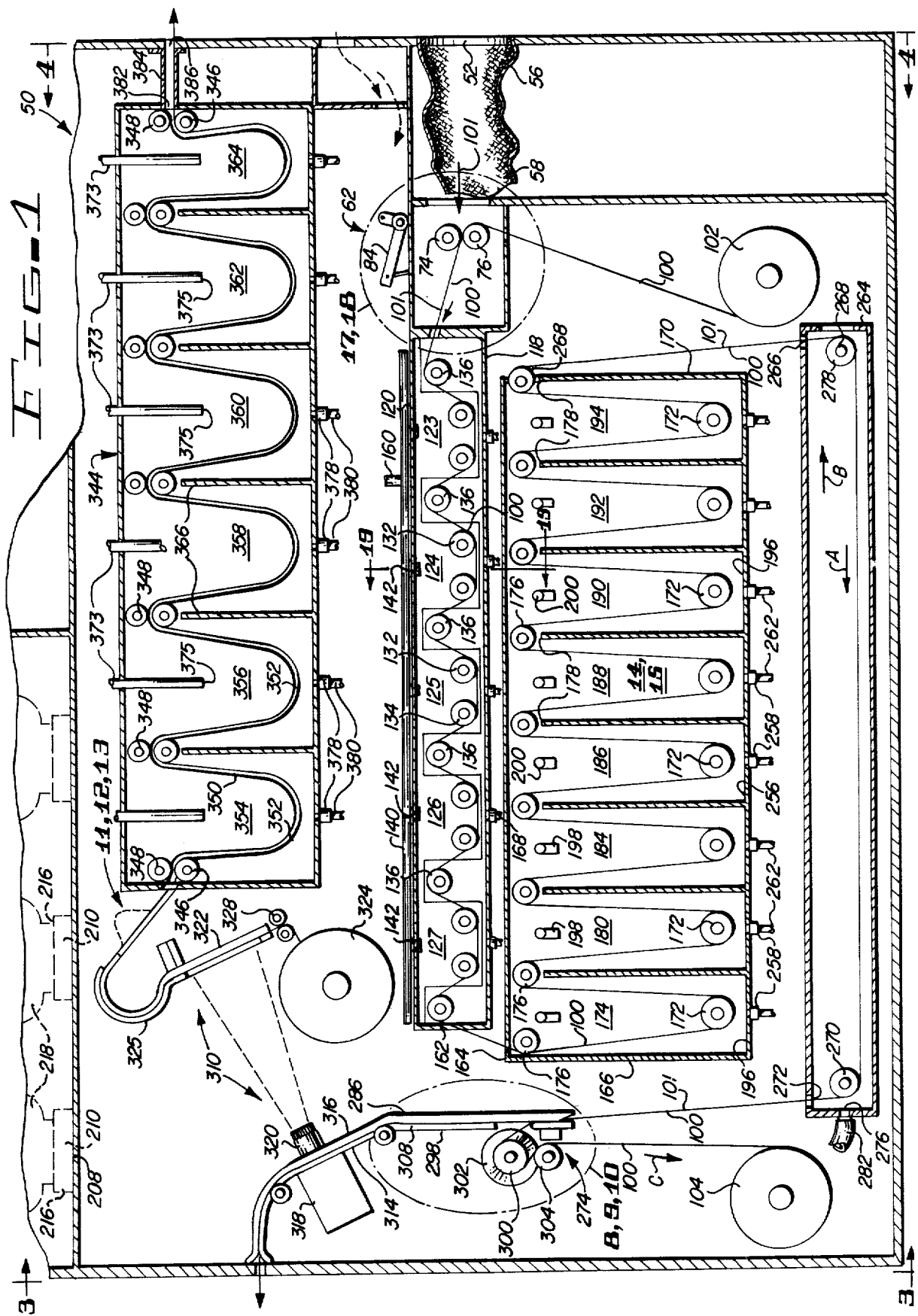

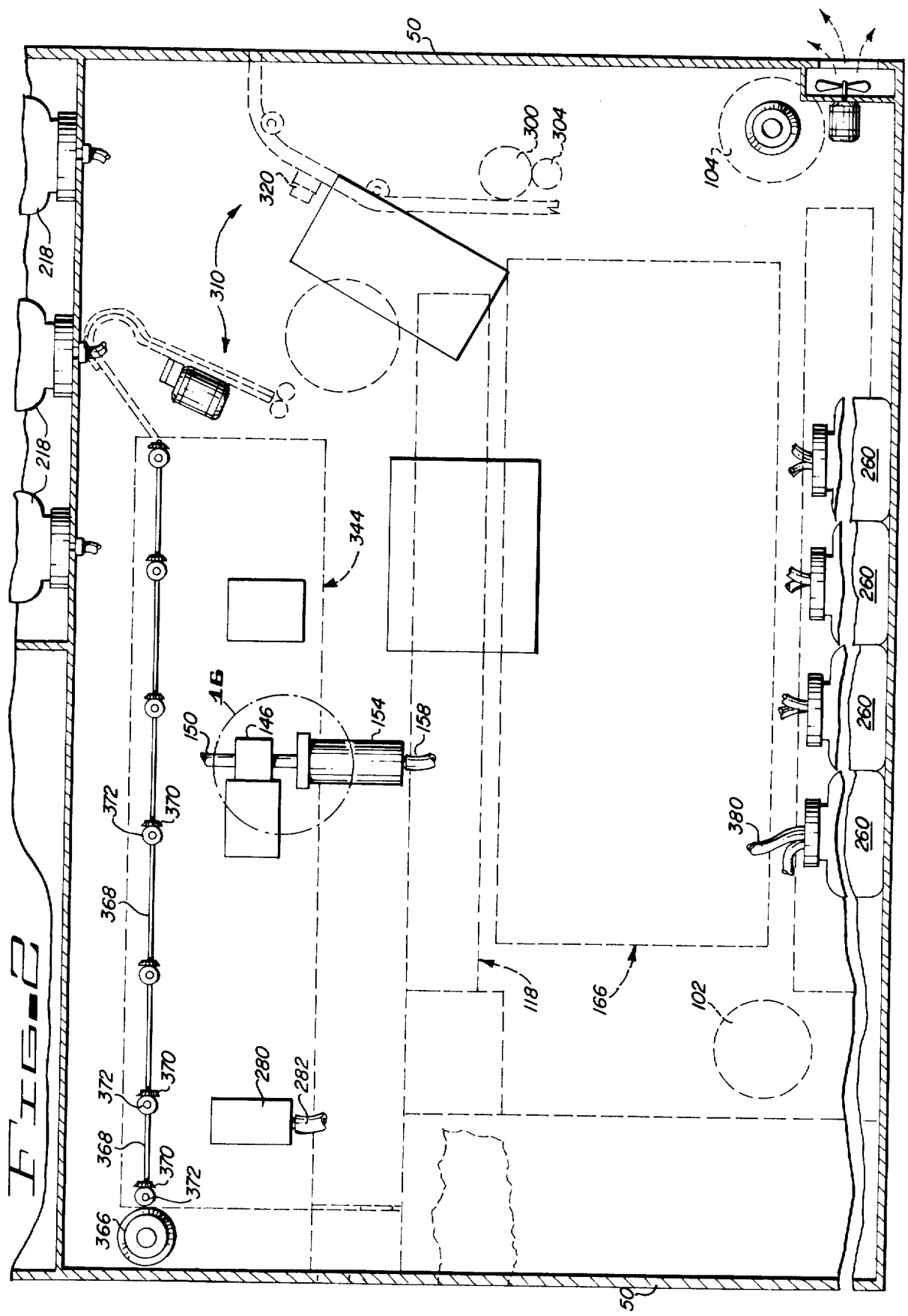

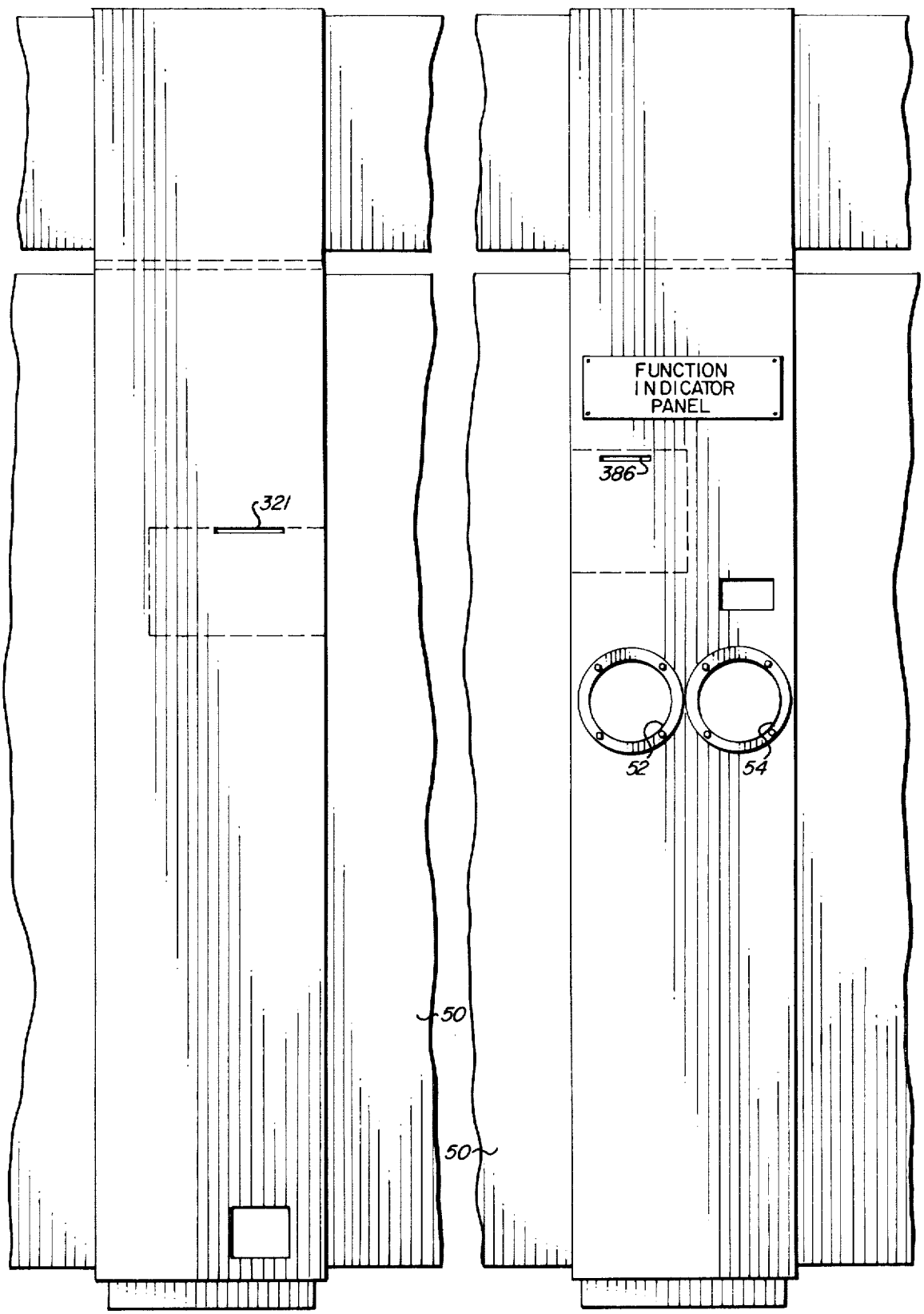

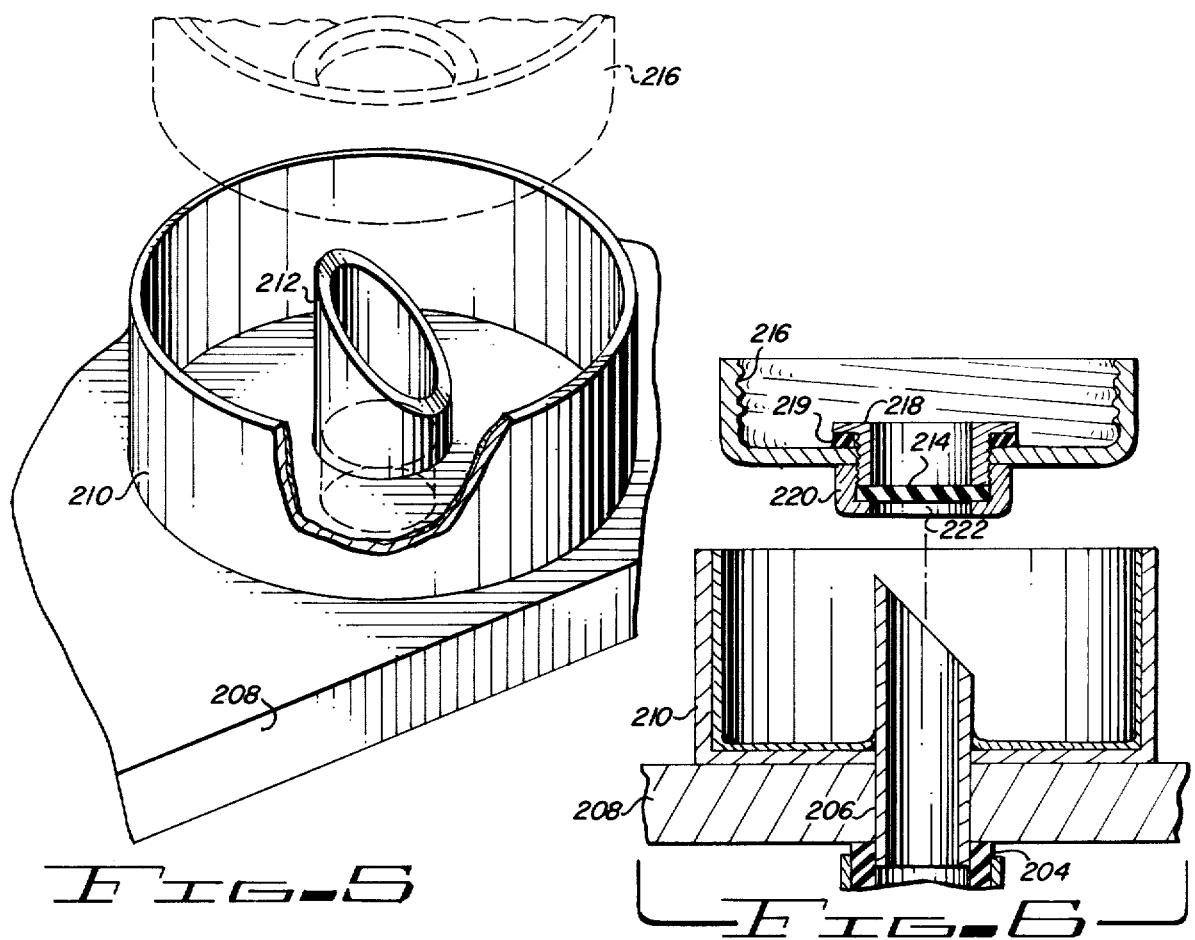
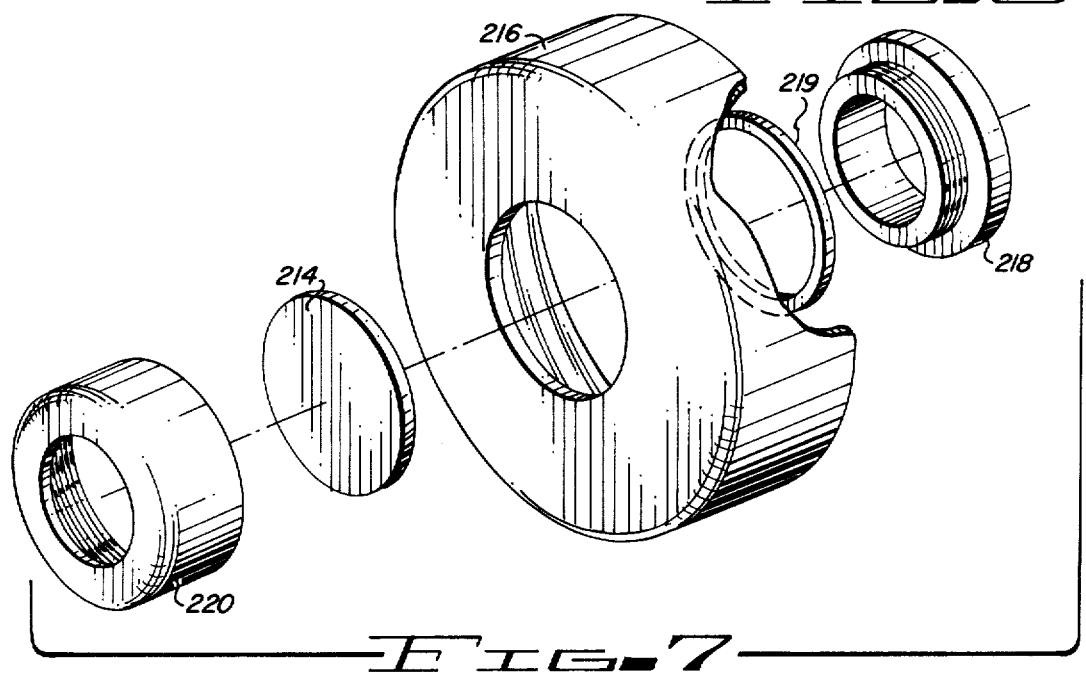

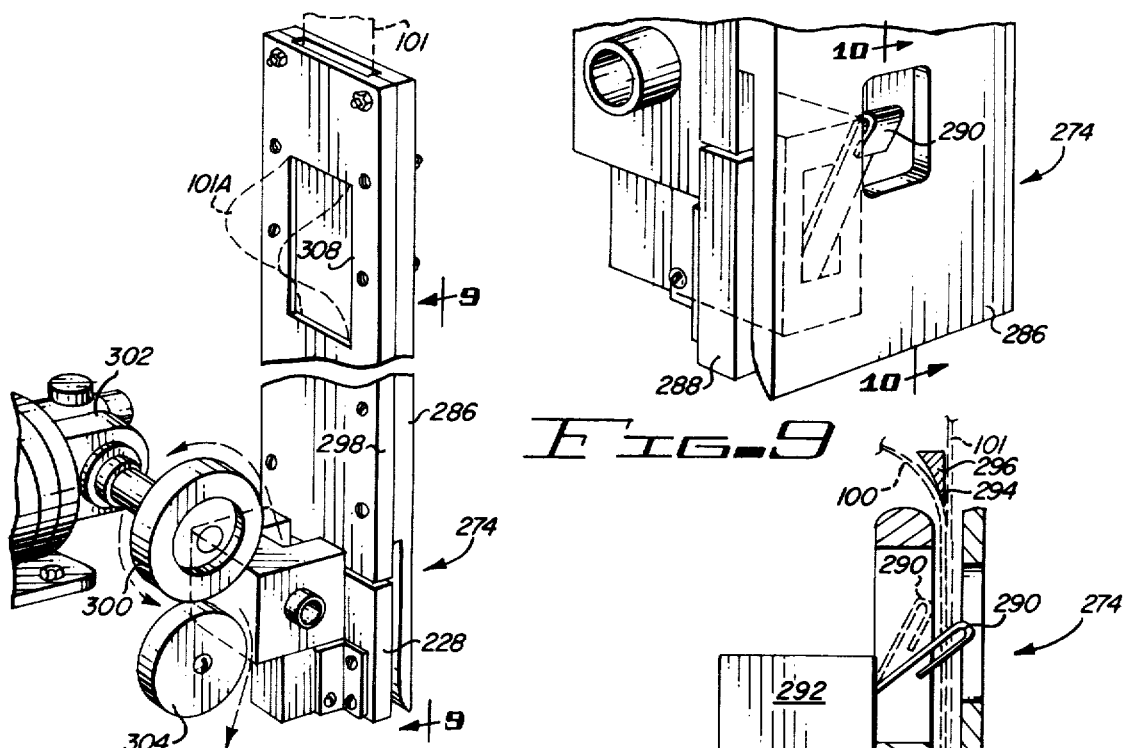
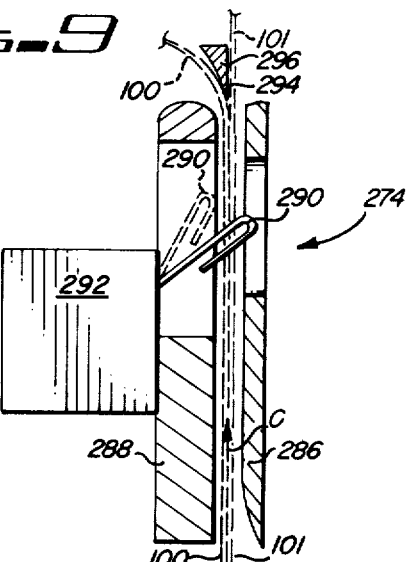
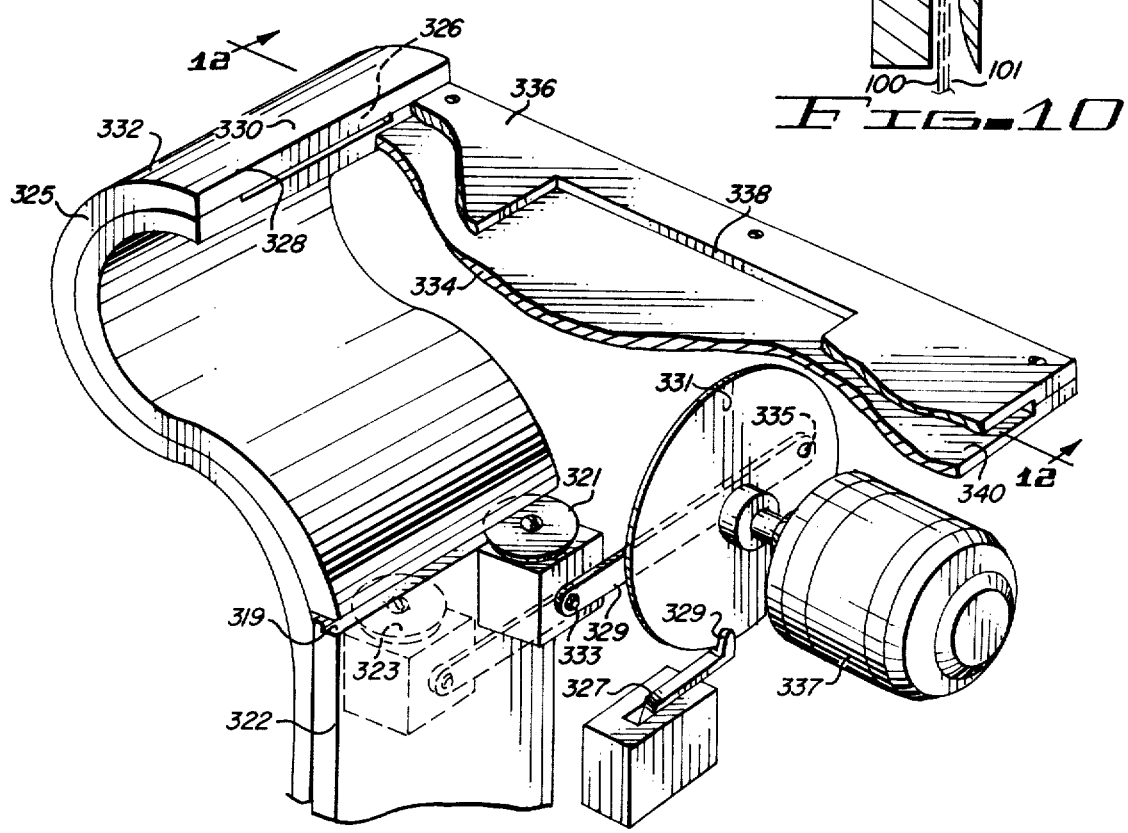

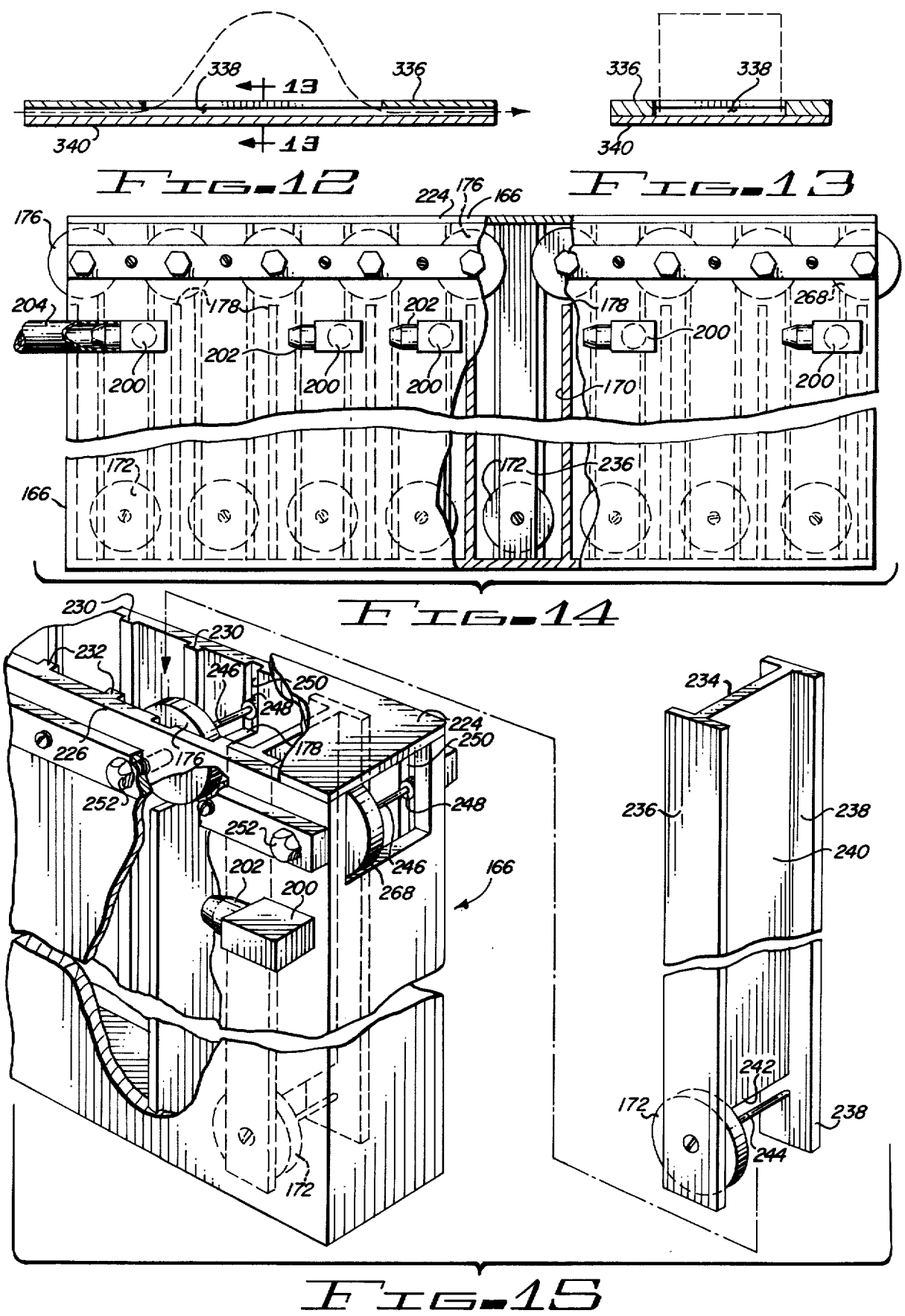

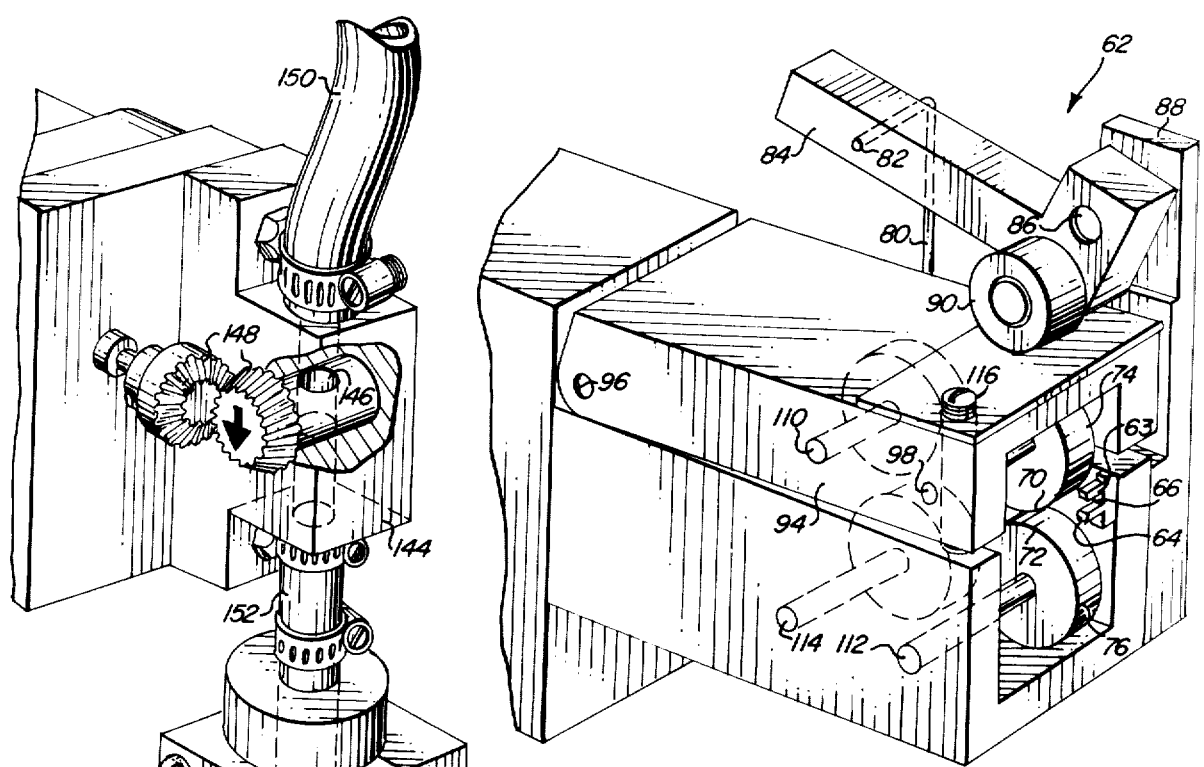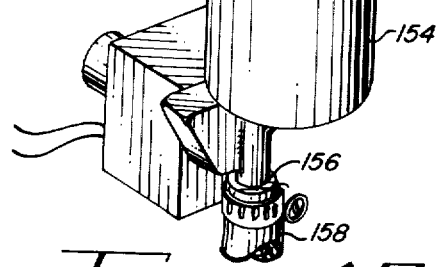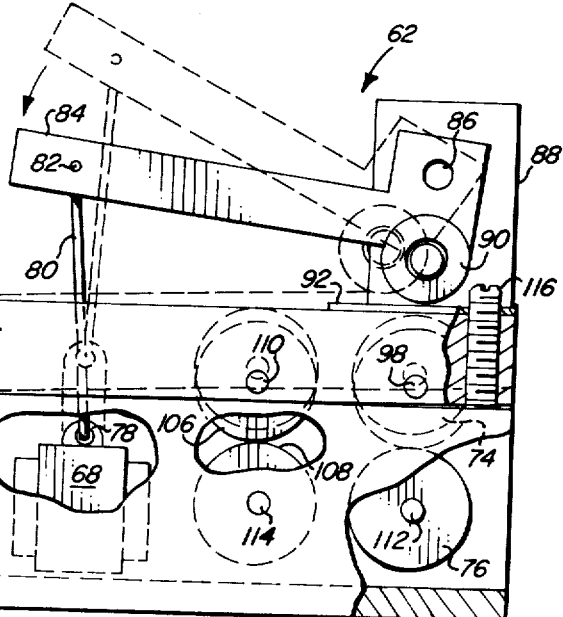
FIG-17
FIG-18
FIG-18

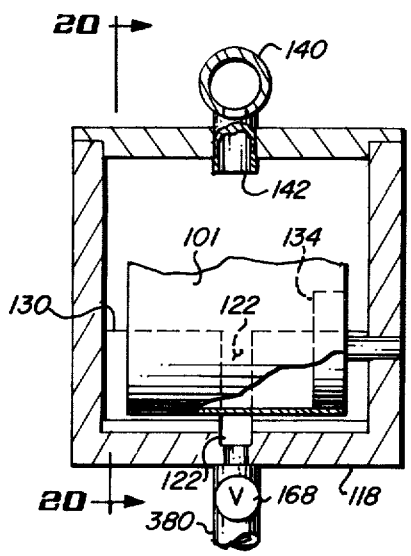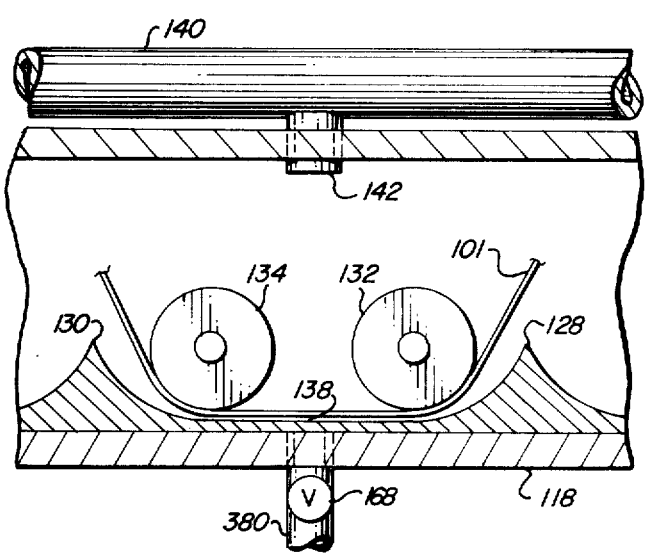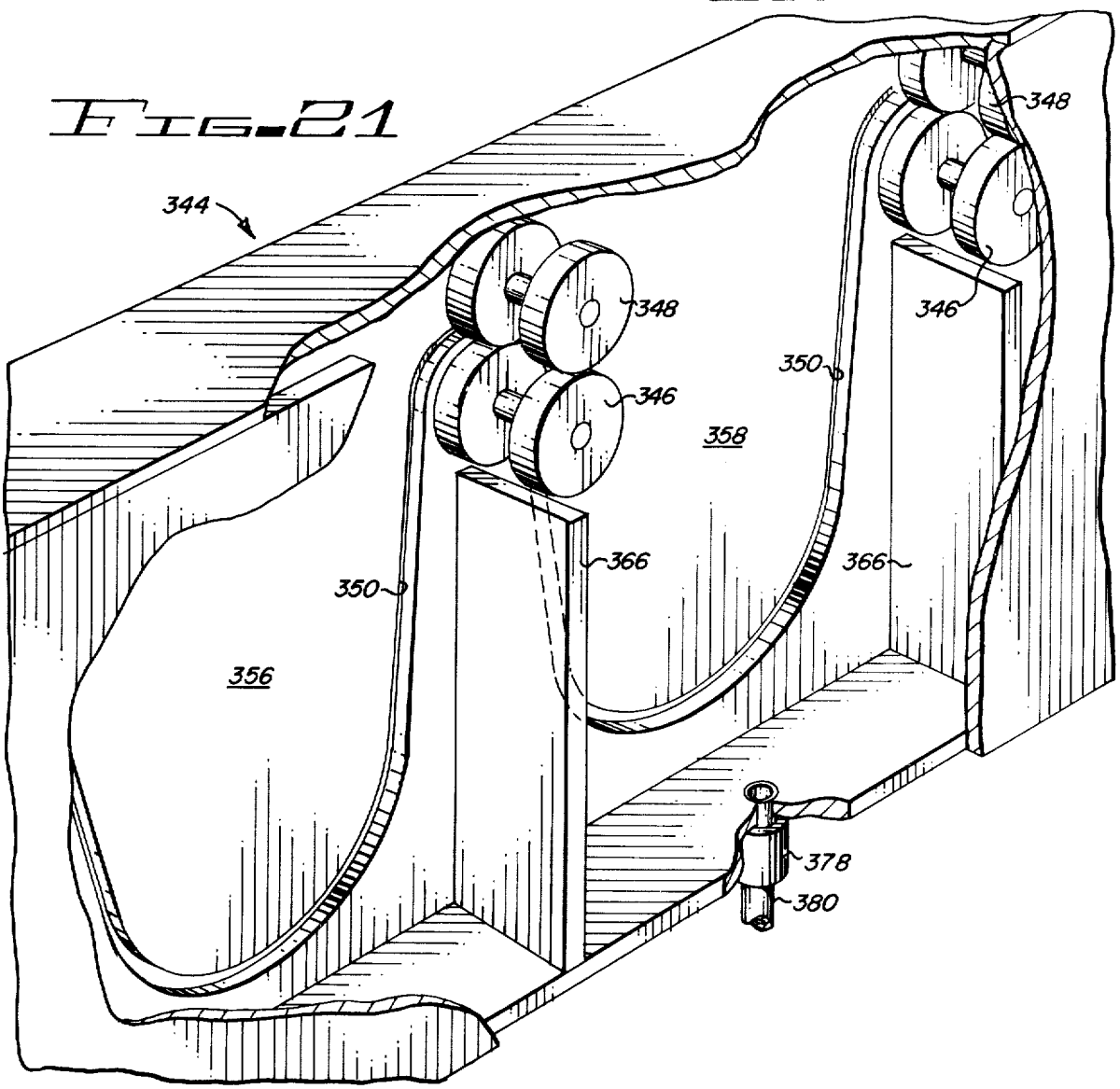

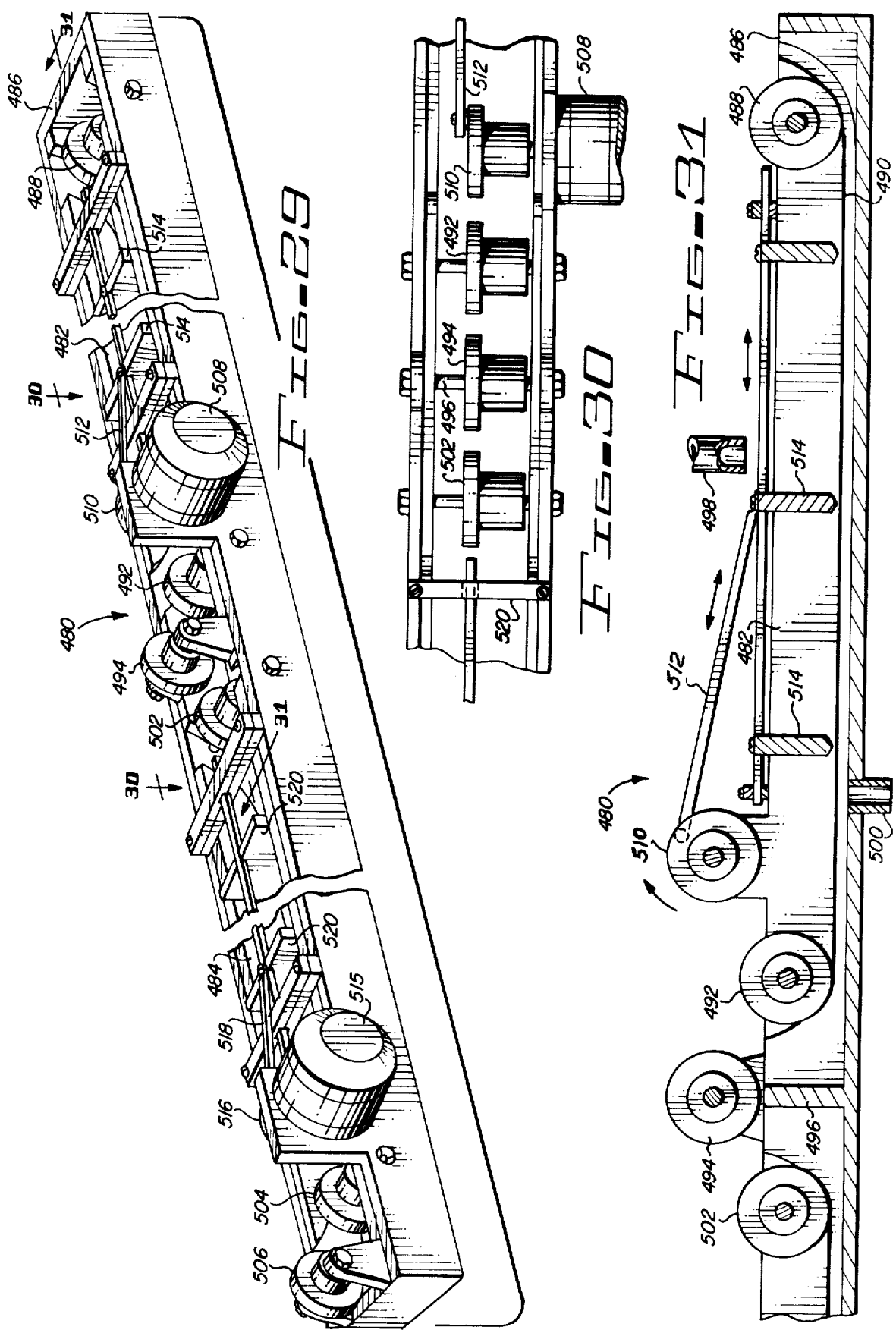

PHOTOGRAPHIC DEVELOPER AND PRINTER

BACKGROUND OF THE INVENTION

There has been a need for a compact film developer and photo printer which may be used to process film such as Kodak Instamatic or other similar film and print pictures therefrom within a short period of time so that the customer does not have to wait several days to have his film developed and printed so as to obtain the desired pictures. Various service has been provided for processing film but in most instances such service requires a full day or more to process film and make prints therefrom and this has been a substantial inconvenience to customers of photographic supplies and developed prints. Heretofore, most of the photographic service has been performed in large facilities and those are usually remote from convenient places such as shopping areas or the like which people frequent daily. Accordingly, and heretofore, it has been impossible to obtain quick service relative to the development of film and the production of pictures therefrom as for example, there have been no services which have conveniently processed film and pictures for the general public within a time period ranging from a half an hour to an hour.

PRIOR ART

U.S. Pat. No. 3,727,815 is believed to be the closest prior art and is a prior patent of the present applicant.

SUMMARY OF THE INVENTION

The present invention comprises a photograph developer and printer all contained for automatic processing of film and printing of pictures in a compact housing which may be located in areas where people frequent as for example shopping centers or large stores where people spend a reasonable amount of time for the developing of film and printing of pictures, as for example, one half an hour to an hour's time. The invention thus provides for the convenient developing of film and printing of pictures therefrom during shopping hours while a customer is in a given shopping area or retail store. The photograph developer and printer of the invention is also very conveniently locatable in various other areas where people may have their photographic film processed and pictures printed therefrom so that such service can be conveniently carried out within a short period of time during which a person is in a given area attending to matters other than the procurement of film developing and photograph printing services. The invention comprises a very compact housing which is essentially a darkroom means having light trap sleeves through which a person's hands may reach to place the end of a strip of film into a film transport means which carries the film progressively through a developing tank, a film processing tank, a dryer and to a photo printer which exposes the film relative to sensitized photo paper which is then subsequently developed in a second developing tank within the darkroom area of the housing and whereby the film is returned to the customer through one outlet opening having light trap means therearound and whereby the finished photographs are returned to the customer through another light trap opening to the exterior of the housing.

The film developing means internally of the housing comprises means for automatically changing the developer, as for example flushing old developer and replacing it with new developer for each batch of film which passes through the machine.

The film developer tank of the invention comprises a plurality of individual sumps through which film is moved in a serpentine path by means of an adhesive tape engaged with the marginal edge of the film and wherein each sump portion communicates with the other so that an equal amount of developer may be placed in each of the compartments and wherein the bottom portions of the compartments are downwardly converging; the transport means in the developer comprising a plurality of rollers arranged in a serpentine path over which said tape is engaged and some of the rollers being disposed in the bottom of said sump portions so as to carry the film in contact with the developer in the converging sump portions such that a minimal amount of developer may be used to attain efficient contact with the film such that fresh developer may be charged into the sump portions of the developer tank for each new strip of film passing through the developer tank.

The developer tank is provided with means for rapidly draining used developer from the sump portions therein and for rapidly recharging the sump portions with fresh developer by means of a metering valve which controls the amount of developer delivered to the developer tank upon each cycle of operation. The invention comprises a novel compact arrangement of a film developer tank, all horizontally elongated and superimposed relative to each other so as to afford a complete film processing and printing system in a small area. The housing also encloses fresh chemical supply containers as well as used chemical collectors whereby the only external feature during operation may be an electrical conductor which may be plugged into any conventional electrical outlet.

The invention also comprises a novel developer tank means having an aggitating device which aggitates chemicals over film which is concurrently moved therethrough.

The invention also comprises a novel modified developer tank means which includes a plurality of tanks in series such that individual strips of film may be started through the machine of the invention in a relatively short time after the preceeding strip of film has been started through the machine. The lapse of time between the strips of film will be less than the overall time required to chemically develop film and thus, the series of developer tanks will each have individual chemical supply and drain systems such that each individual strip of film entered thereinto will be supplied fresh chemicals.

Accordingly, it is an object of the present invention to provide a novel means for securely engaging marginal edges of film adhesively to a transport tape which is pulled through the various developer and processor areas of the machine of the invention.

Another object of the invention is to provide a very compact photo developer and printer which may be used to provide rapid short term service for persons during times when they are in public areas such as retail stores or the like.

Another object of the invention is to provide a machine which is very simple and easy to operate for obtaining automatic film developing and photo printing service.

Another object of the invention is to provide a photo developer and printer which is provided with a novel arrangement of film transport means together with a film developer tank, a processing tank and a dryer as well as a photographic printer and print developing tank wherein all the tanks are horizontally elongated and superimposed to provide a compact arrangement of the chemical processing equipment of the invention.

Another object of the invention is to provide a novel film developer tank having a means for quickly draining used chemicals therefrom and replacing them with fresh chemicals for each individual film processing operation involving each row or strip of film transported through the film developer tank.

Another object of the invention is to provide a novel developer tank means wherein liquid chemicals are disposed such that film may be transported therethrough and a novel agitator means for agitating the liquid chemicals over the film for fairly moving the liquid in contiguous relationship back and forth over the surface of the film.

Another object of the invention is to provide a novel aggitator means for chemicals in a film developer tank which operates in close proximity to the film and wherein the film is transported in a guide means in a close proximity to the agitator means.

Another object of the invention is to provide a novel developer tank means having a series of continuous film developer tanks adapted to reduce the time period lapse between the entrance of one strip of film and the entrance of a successive strip of film into the machine for developing.

Another object of the invention is to provide a novel means for adhesively and securely engaging an adhesive transport tape to marginal edges of film for moving the film through the developer tank, as well as the processing tank of the invention.

Another object of the invention is to provide a novel combination of a housing having a darkroom interior and light trap means for a person's hands for fitting film into a novel film transport means which acts by tension and adhesion to carry the film through serpentine paths in the developer tank, the processing tank and through the dryer to a stripper device which separates the adhesive tape from the film prior to the transportation of the film to a light projector and printer means.

Another object of the invention is to provide a very simple and compact photo developer and printer which may be used to develop film and make photographic prints therefrom in a short period of time such as may involve one half to one hour's time during which shoppers or patrons of stores are shopping. Thus, a means is provided by which a retail store owner may hold the interest of shoppers or patrons in the area during such time as the film is being processed and photographic prints are made therefrom.

Further objects and advantages of the invention may be apparent from the following specification, appended claims and accompanying drawings.

BRIEF DESCRIPTION OF THE DRAWINGS

FIG. 1 is a fragmentary vertical sectional view taken through the housing of the photo developer and printer of the invention;

FIG. 2 is a similar view to that shown in FIG. 1 but showing a sectional view vertically through the housing of the invention and viewing the equipment therein from the opposite side of that as shown in FIG. 1;

FIG. 3 is an enlarged fragmentary end view taken from the line 3—3 of FIG. 1;

FIG. 4 is an enlarged fragmentary end view taken from the line 4—4 of FIG. 1;

FIG. 5 is a fragmentary perspective view of a chemicals container support which stores fresh chemicals for use in the developer and printer of the invention;

FIG. 6 is a vertical sectional view taken through the structure shown in FIG. 5 and illustrating further a chemicals container cap superimposed above said support in position so as to provide for pursing of a closure diaphram and allowing the contents of the container to communicate with the fluid system of the invention;

FIG. 7 is an exploded view of the parts of the container cap as shown in FIG. 6;

FIG. 8 is an enlarged fragmentary view of the structure outlined by the broken line 8 designated in FIG. 1 of the drawings;

FIG. 9 is a perspective view of the structure shown in FIG. 8 and taken from the line 9—9 in FIG. 8;

FIG. 10 is a fragmentary sectional view taken from the line 10—10 of FIG. 9 showing by broken lines a varied position of a part of the structure;

FIG. 11 is a fragmentary perspective view of the print paper cut off mechanism of the invention;

FIG. 12 is a fragmentary sectional view taken from the line 12—12 of FIG. 11;

FIG. 13 is a sectional view taken from the line 13—13 of FIG. 12;

FIG. 14 is a fragmentary side elevational view taken of the film developer tank of the invention showing portions thereof broken away and in section to amplify the illustration;

FIG. 15 is an exploded view showing in perspective details of the developer tank mechanism shown in FIG. 14;

FIG. 16 is an enlarged fragmentary sectional view of a metering valve mechanism as outlined in broken line 16 on FIG. 2 of the drawings;

FIG. 17 is an enlarged perspective view of the film receiving mechanism as indicated by a broken line 17 in FIG. 1 of the drawings;

FIG. 18 is a side elevational view of the mechanism shown in FIG. 17 showing by broken lines a varying position of parts thereof and also showing portions broken away and in section to amplify the illustration;

FIG. 19 is a longitudinal sectional view taken through a sump of the film developer tank and showing a structure typical to all the several sumps therein;

FIG. 20 is a transverse sectional view taken from the line 20—20 of FIG. 19;

FIG. 12 is a fragmentary perspective view of the picture developer tank of the invention showing portions thereof broken away and in section to amplify the illustration;

FIG. 29 is a perspective view of a developer tank means of the invention employing a plurality of developer tanks in series so as to permit strips of film to pass successively through one tank and into the next tank in series;

FIG. 30 is a fragmentary plan view taken from the line 30—30 of FIG. 29; and

FIG. 31 is a vertical sectional view taken from the line 31—31 of FIG. 29.

DESCRIPTION OF THE PREFERRED EMBODIMENTS

Figure 22:
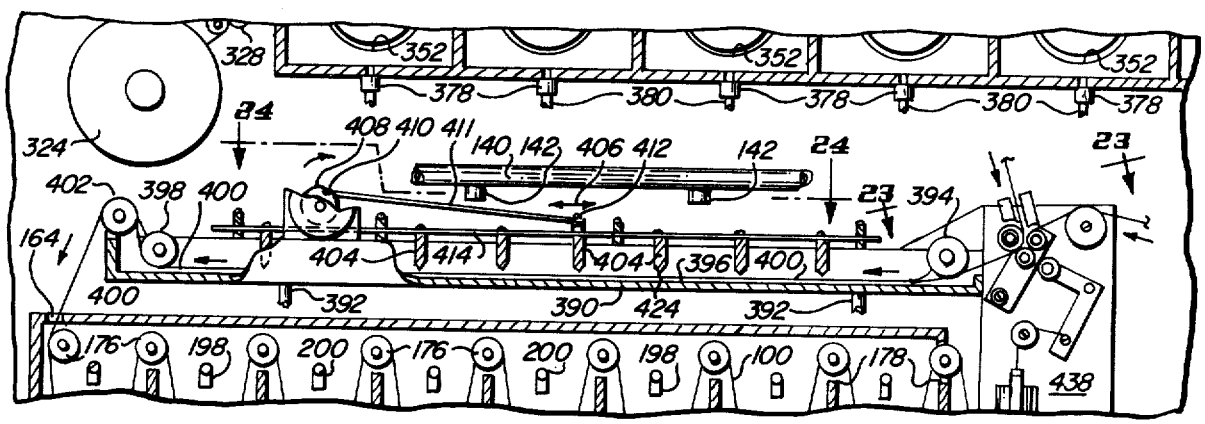
FIG. 22 is a sectional view taken substantially on the same plane as FIG. 1 and also FIG. 20 and FIG. 22 discloses a preferred form of the invention as it relates to the developer tank means of the invention.

As shown in FIG. 1 of the drawings, the photo developer and printer of the invention comprises a housing 50 having an interior which provides a darkroom enclosure and disposed in one end of the housing 50 as shown best in FIGS. 1 and 4, are a pair of arm receiving openings 52 and 54 which are similar and which extend through the side wall of the housing 50 and communicate with flexible light trap sleeves such as the sleeve 56 surrounding the opening 52, as shown in FIGS. 1 and 4 of the drawings. The flexible sleeve has an elastic closure end 58 which is disposed adjacent to a film transport mechanism at a receiving end 60 thereof. The film transport mechanism being designated 62, as shown in FIG. 1 of the drawings; and with reference to FIGS. 17 and 18 of the drawings, the details of this mechanism 62 at the receiving end of the film transport means are disclosure.

A roll of film is handled by a person's hands with his arms through the openings 52 and 54 and through sleeves such as the sleeve 56 and the person's hands may be disposed adjacent the inlet end or receiving end 60 of the film transport mechanism 62.

The person's hands may expose the leading edge of the roll of film and in accordance with the disclosure of FIG. 17, the end of the film may be inserted between a pair of elements 63 and 64 of an infrared photoelectric sensor; and this device will not fog the film. The elements 63 and 64 are spaced apart so that the film may be inserted in a slot 66 between the elements 63 and 64 and as the film is pushed through this slot, the photoelectric sensor closes a circuit to a solenoid 68 as the film is inserted between peripheries 70 and 72 of nip rollers 74 and 76 respectively.

The infrared photoelectric sensor activates a solenoid 68, as shown in FIG. 18, which is provided with linkage 78, coupled to a connecting rod 80 pivotally connected at 82 to a nip roll actuating lever 84, which is pivoted at 86 to the frame 88 of the mechanism 62 and a roller 90 rotateably mounted on the lever 84, when pivoted about the axis of the pivot 86, bears upon a plate 62 pivotally moving a nip roller support 94 about its pivotal axis 96 and the nip roll 74 is pivotally mounted on an axle 98 carried by the member 92 and when pivoted downward about the axis of the pin 96 by means of the solenoid 68, the periphery 70 of the nip roll 74 is forced against the incoming film and clamps it onto an adhesive transport tape 100 by forcing the film and the tape together between the peripheries 70 and 72 of the nip rollers 74 and 76. As shown in FIG. 1 of the drawings, the adhesive tape 100 is operated in a similar manner of that described in my former U.S. Pat. No. 3,727,815. The adhesive tape 100 progresses from a supply roll 102 through the machine to take up roll 104 which will be hereinafter described in detail.

It will be seen that a second pair of nip rolls 106 and 108 are similar to the nip rolls 74 and 76. The nip roll 106 being carried on an axle 110 on the pivoted bar 94 in a similar manner to the carriage of the nip roll 74 hereinbefore described. Accordingly, when the solenoid 68 is activated, both nip rolls 74 and 106 are moved downward into clamping action relative to the nip rolls 76 and 108 for securely engaging the adhesive tape 100 to the edge of film and this edge being the marginal edge beyond the image area, as taught in my former patent, hereinbefore referred to. It will be seen that the nip rolls 76 and 108 are stationarily mounted on respective axles 112 and 114 and that the bar 94 is provided with a set screw 116 which provides an adjustable stop for downward movement of the bar 94 and the nip rolls 74 and 106 so as to limit the overall squeezing action of the nip rolls relative to the edge of the film and the adhesive tape 100 as the tape is adhesively secured to a marginal edge of the film as it is advanced by tension of the tape 100 as it moves in the direction of the arrows in FIG. 1 of the drawings.

From the mechanism 62, shown in FIGS. 1, 17 and 18, the tape 100, together with a layer of film 101, are moved through an inlet opening 118 in a film developer tank 120. This film developer tank being similar to that shown in my former U.S. Pat. No. 3,727,815 and also being constructed in accordance with the details of FIGS. 19 and 20.

The cross section of the developer tank 120 is substantially as shown in FIG. 19, wherein a communicator passage 122 in the bottom of the tank intercommunicates with a plurality of successive compartments 123, 124, 126, 125, and 127. The opposite ends of these compartments are provided with raised portions 128 and 130, as shown in FIG. 20 of the drawings, and the slot 122 extends upwardly through these portions 128 and 130 to their uppermost edges so as to efficiently conserve the amount of developer that is charged into the tank each time a batch of film is entered thereinto. The sloping portions 128 and 130 are disposed adjacent the guide rollers 132 and 134 respectively, as shown in FIG. 20 of the drawings, and a pair of such rollers or guide rollers 132 and 134 are disposed in each compartment 123 and 127.

Intermediate drive rollers 136 are disposed between the compartments 123 and 124, and 124 and 125, and 125 and 126, and 126 and 127. These rollers 136 are elevated above the rollers 132 and 134 at each of the developer compartments and thus the film 101 travels in an up and down serpentine path alternately over the rollers 136 and then over the pairs of rollers 132 and 134. The rollers 132 and 134 thus pass into shallow sump areas 138 between the incline portions 128 and 130 and these sump areas 138 all communicate through the communicating slot 122, hereinbefore described, in connection with FIGS. 19 and 20.

A developer fluid manifold 140 is tubular as shown in FIG. 19 and is provided with downwardly directed outlets 142 which communicate with each respective compartment 123, 124, 125, 126 and 127; and a fluid metering valve 144, shown in FIG. 16 is operable to charge the manifold 140 and to deliver a measured amount of liquid into the compartments 123 and 127. The metering valve 144, as shown in FIG. 16, is provided with an adjustable barrel valve orifice 146 adjustably driven by a pair of miter gears 148 so as to provide a constant flow cross section from a supply tube 150 from a suitable container, as will be hereinafter described.

The barrel valve 146 has an outlet tube 152 communicating with a solenoid valve 154 which has an outlet 156 communicating with a flexible tube 158 which connects with the manifold 142 at 160, as shown in FIG. 1 of the drawings. Thus, the manifold 142 may be charged with a certain amount of liquid depending upon the time the solenoid valve 154 is open and depending upon the cross sectional flow area to which the valve 146 is adjusted.

It will be seen that the transport tape is adhesively connected to the strip of film 101 and continues through the developer tank 120 in a serpentine path over the rollers 136 and 132 and 134 and passes outwardly from the developer tank 120 through an outlet or delivery opening 162, shown best in FIG. 1 of the drawings. The tape 100 and film 101 pass through this delivery opening 162 into an inlet or entrance opening 164 in a processing tank 166 which is disposed below the tank 120.

The developer tank 120, as shown in FIG. 1, is an elongated horizontal tank and is disposed above the processing tank 166 which is elongated and disposed in superimposed relation below the tank 120.

It will be seen that a plurality of solenoid valves 168, communicate with the slot 122 and the various compartments 123, 124, 125, 126 and 127. These valves 168 are adapted quickly to drain used developer from the sump portions of the developer tank 120 following each processing operation on each individual strip of film. Accordingly, it will be appreciated that the manifold 140 may quickly supply fresh fluid immediately after the used fluid has been very quickly drained through the drain valves 168.

The film 101 and the adhesive transport tape 100 pass through the processing tank 166 in an up and down serpentine path and from the guide roller 170 near the opening 164 the tape and film 100 and 101 respectively pass downward and around a roller 172 in the bottom of a first compartment 174. The tape 100 and film 101 then pass upwardly over a guide roller 176 straddling the upward edge 178 of a partition disposed between the compartments 174 and an adjacent compartment 180, which has a guide roller 182 in the lower portion thereof over which the transport tape 100 and the film 101 are moveably guided.

Accordingly, the various compartments in the processing tank, including similar compartments 174, 180, 184, 186, 188, 190, 192 and 194 are separated by partitions similar to the partition 179 whose upper edge is designated 180 as hereinbefore described. The partitions all extend into sealed relationship with a bottom 196 of the processing tank 166 and thereby form separate compartments for various chemicals. The compartments 174 and 178 contain a bleach material, the compartments 184 and 186 contain water, the compartments 188 and 190 contain a fixer chemical, the compartment 192 contains water and the compartment 194 contains a stabilizer chemical.

Each compartment is filled through a tubular liquid inlet tube having a downwardly directed outlet 198 which is adapted to be disposed somewhat below the upper edges 178 of the various partitions in the tank 166 so as to operate substantially like a chicken feeder such that when the liquid level passes above the open end 198, the flow into the respective compartment is automatically shut off. Thus, a high liquid level is maintained in all the compartments 174 through 194 and the open ends of the tubular conduits communicate through fixtures 200 on one side of the tank 166, as shown best in FIG. 14. These fixtures 200 are each provided with a nipple portion 202, over which a flexible tube 204 is fixed and sealed; each tube 204 extending from a tank as shown in FIGS. 5, 6 and 7. Each tube 204 communicates with a respective fixture 200, being shown fragmentarily in FIG. 6 of the drawings; and connected to a bayonet tubular outlet 206, extending through a shelf 208 and communicating through a cup-shaped support 210 in which an angular cut sharp edge tubular bayonet end portion 212 of the tube 206, projects upwardly and is adapted to pierce a diaphram structure 214 of a cap 216 sealingly secured to necks of chemical containers 218, all as shown best in FIGS. 1, 6 and 5 of the drawings. Each container cap 216 is adapted to screw onto the open neck of one of the containers 218 and is provided with a pierceable diaphragm 214 which is screwthreadably held in sealed relation with the cap 216 by means of a flanged externally screwthreaded fixture 218 engaging a gasket 219 clamped against the interior of the cap 216 by means of a screwthreaded cap 220 which bears against the pierceable diaphragm 214 and which is provided with an opening 222 through which the piercing bayonet tube 212 may be extended in order to gain communication with liquid in the respective container 218. Accordingly, it will be seen that the containers 218 through the hollow bayonet fittings 212 pass liquid through the tubes 204 to the fittings 200 on the side of the developer tank 166 and coupled to those fittings 200 are the tubes having open ends 198 disposed below the liquid level and below the upper edges of the partitions such as the upper edge 178 shown in FIG. 1 of the drawings.

As shown in FIGS. 14 and 15 of the drawings, the processing tank 166 is provided with a cover 224 and opposite sides 226 and 228 of the tank 166 are provided with pairs of inwardly projected ribs; as for example a side 228 is provided with spaced pairs of ribs 230 and directly opposite the ribs 230 are ribs 232 projecting from the inner side of the side 226 and these ribs are disposed vertically in spaced relationship to each other and retain a generally I-shaped in cross section vertical member 234 which is slideably and gravitationally carried between the members 230 and 232 respectively. Each member 234 is provided with opposite substantially T-shaped flanges 236 and 238 interconnected by a central web 240 which is cut away at 242 near the lower end of the member 234 and a roller axle 244 is disposed between the flanges 236 and 238 and carries a yard roller 246 which is adapted to provide a guide for the adhesive tape 100 and a marginal edge of film 101, as hereinbefore described. Thus, the roller guides are provided in the lower portions of the compartments 174, 180, 184, 186, 188, 190, 192, and 194 of the processing tank 166.

The tape and film guide rollers, such as the rollers 176, above the upper edges 178 of the partitions in the processing tank 166, are mounted as shown in FIGS. 14 and 15. These rollers, as for example roller 170 shown in FIG. 15, are provided with a shaft 246 having a bearing 248 at one end thereof and this bearing 248 is disposed in a slot 250 in the side 228 of the processing tank 166 and the bearing 248 is fixed therein while a screwthreaded bearing 252 is screwthreaded in the opposite side 226 of the processing tank 166 and is similar to bearings 46, 74, and 78 in my former patent hereinbefore referred to; the screw 252 being provided with a socket in the end thereof which fits over the extending end of the shaft 246 which is adjacent to the side 226 of the processing tank 166. Thus, all of the rollers 170 and 176 are disposed adjacent the upper edges 178 of the partitions 170 and are mounted similarly, as shown in FIG. 15. It will be noted that the members 234, shown in FIG. 15, may be vertically removed by pulling them upwardly between the respective ribs 230 and 232 for the purpose of either threading the adhesive tape 100 through the processing tank 166 or for maintenance as may be desired.

The processing tank 166 is provided with an enclosed bottom portion 256 as shown in FIG. 1 of the drawings and communicating with each of the compartments 170, 174, 184, 186, 188, 190, 192 and 194 is a suitable drain valve 258. These valves 258 each communicate with a respective waste liquid storage container 260, as shown best in FIG. 2 of the drawings, and each valve 258 is provided with a drain tube 262 which extends from the respective valve 258 to the respective waste liquid storage container 260 disposed in the bottom portion of the housing 50, all as shown best in FIGS. 1 and 2 of the drawings. It will be understood that the valves 258 are preferably electrically operated solenoid valves capable of being programmed for draining of the respective compartments of the processing tank 166 in accordance with use requirements.

Disposed below the processing tank 166 is a horizontally disposed elongated dryer housing 264 having an inlet opening 266 for the transport tape 100 and the film 101 and the inlet opening 266 is directly below an outlet opening 268 or delivery opening 268 in the end of the processing tank 166 at the opposite end thereof from the receiving or inlet opening 164. The opening 268 is above an upper edge 178 of one of the partitions 170, all as shown in FIG. 1 of the drawings, and as the tape 100 and film 101 pass into the receiving or inlet opening 266 of the dryer housing 264, the tape 100 and film 101 pass over a guide roller 268 and the transport tape 100 and film 101 pass horizontally through the dryer housing 264 and over another guide roller 270 and directly from this guide roller 270 the tape 100 and film 101 pass outwardly through an outlet or delivery opening 272 and in an upward direction toward a stripping mechanism 274 as will be hereinafter described in detail.

The dryer housing 264 is provided with a warm air inlet 276 and a warm air outlet 278 and, as shown in FIG. 2 of the drawings, a dryer heater and fan assembly 280 is provided with a warm air outlet 282 which communicates with the warm air opening 276 in the dryer housing 264, all as shown best in FIGS. 1 and 2 of the drawings.

It will be seen that warm air is operated in counterflow relationship to the movement of the tape 100 and film 101 as indicated by an arrow A in FIG. 1 of the drawings. The tape and film proceed in the direction of the arrow A while the warm air proceeds through the housing 264 in the direction of the arrow B from the inlet opening 276 to the outlet opening 278.

Thus, after passing through the processing tank 166, the tape and film are dried in the dryer housing 264 and the tape transports the film to the stripper mechanism 274 which is shown in detail in FIGS. 8, 9 and 10 of the drawings. The tape and film 100 and 101 respectively pass upwardly from the delivery opening 272 of the dryer housing 264 and pass between a pair of receiver plates 286 and 288 of the stripper mechanism wherein a microswitch actuating arm 290 projects into the path between the plates 286 and 288, as will be hereinafter described in detail, so that the arm 290 may actuate the microswitch 292.

As the tape 100 and film 101 pass upwardly, an edge 294 of a separating blade 296 strips the tape 100 from the film 101 and the film 101 continues to move upward between the plate 286 and the plate 298 which is a continuation of the plate 288, hereinbefore described. The tape 100 passes laterally from the separating blade 296 and over a tape drive roller 300 which is driven by a motor 302 and pulls the film through the developer tank and the processing tank as well as the dryer housing, hereinbefore described, and as the tape and film pass around the roller 300 and proceed over an idler roller 304 directly downwardly to the tape take-up roller 104 which is a powered roller with the usual slip clutch mechanism allowing it to keep pace with the motor driven roller 300. Thus, the tape drive motor 302, together with its drive roller 300 and idler roller 304 are responsible for pulling the tape 100 from the supply roll 102 through the entire areas of the developer tank, the processor tank, and the dryer housing 264, all as hereinbefore described, and to thereby pull the film 101 through a respective path until the film is separated from the tape 100 by means of the blade 296, so that the film 100 may proceed upwardly between the plates 286 and 298, as shown in FIGS. 1 and 8 of the drawings. An opening 308 in the plate 298 provides for a loop of slack film, designated 101A in FIG. 8 of the drawings. This slack portion of the film is occasioned by a constant operation of the roller 300 by the tape drive motor 302 while the film is subsequently subjected to intermittent operation of the photographic printer designated 310 in FIG. 1 of the drawings. This printer includes a light source as well as an easel structure upon which sensitized paper is subjected to projected images from the light source. Thus, the printer 310 is operated intermittently while the drive roller 300 operates constantly and therefore, at times, the slack loop 101A projects through the opening 308 in the plate 298 and when the film is advanced by the printer, the slack 101A is taken up momentarily.

The film 101, as it proceeds upwardly between the plates 286 and 298 beyond the opening 308 passes over a guide roller 312 shown in FIG. 1 of the drawings and to a position between guide plates 314 and 316 of the printer 310. The printer 310 is a substantially conventional printer comprising an intermittently operated light source 318 having a suitable lens 320 which projects an image to an easel 322, as will be hereinafter described in detail. The light source also includes conventional film drive mechanism which operates on the marginal edge of the film in the conventional drive openings so as to intermittently move the film between the plates 312 and 316 and to index the film according to the exposed frames or images thereon so that each developed image on the film is successively and momentarily projected to the easel 322 which receives sensitized paper from a roll 324. The paper from the roll 324 passes between guide rollers 326 and 328 and then into position for exposure at the easel 322. As shown in FIG. 11, the photo paper is cut off by a rotary blade 321 which transverses a slot 319 at the upper end of the easel 322. The rotary blade 321 is mounted on a moveable carriage having a trunnion 333 coupled to a connecting rod 329 which is also coupled to a crank pin 335 on a crank plate 331 driven by a motor 337 which is intermittently energized in time with the passage of each photograph exposure from the projector 320. The exposed sensitized paper passes from the area 322 and over a looped shaped structure 325 above the easel 322 and the exposed sensitized paper is carried over the looped shaped structure 325 between opposite edges 326 and 328 of a convex slot 330 wherein the paper is confined by a suitable guide plate 332. The paper then passes between a pair of plates 334 and 336 and an opening 338 in the plate 336 provides for a slack loop in the paper which depends upon intermittent driving of the paper as it is momentarily stopped for each exposure at the easel area in correspondence with an individual picture to be produced from and in accordance with the respective frame of the film 101 adjacent the lens 320.

The exposed paper passes outwardly through a delivery opening between the plates 334 and 336 and the exposed paper passes into a receiving opening 342 in a picture developing tank 344 wherein the paper is driven through the tank by means of pairs of nip rolls such as nip rolls 346 and 348 near the receiving opening 342. Opposite edges of the paper which is designated 350 pass in arcuate slots 352 which are downwardly and upwardly directed slots in the various compartments designated 354, 356, 358, 360, 362, and 364.

As shown in FIG. 2 of the drawings, the nip rolls 348 are driven by a motor 366 which drives a shaft 368 carrying miter gears 370 which cooperate with complimentary miter gears 372 coupled to shafts of the nip rollers 348.

The peripheries of the nip rollers 346 and 348 are sufficiently close so as to grip the exposed paper 350 and to drive it through the successive compartments 354 through 364 inclusive.

The compartment 354 is adapted to contain developer therein. The compartments 356 and 358 contain water. The compartment 360 contains bleach. The compartment 362 contains water and the compartment 364 contains a stabilizer chemical.

The nip rollers 348 are disposed above and straddle upper edges 366 of partitions which are disposed between the respective compartments 364 to 354 and the relationship between the nip rollers 348 and the upper edges 336 is similar to the relationship between the rollers 176 and upper edges 178 hereinbefore described in relation to the processing tank 166.

The manner in which the chemicals are maintained in the developer tank 344 is similar to that of the processing tank 166 in which supply tubes 373 are provided with lower ends 375 disposed generally below the upper edges 366 of the partitions between the compartments and thus establish a liquid level below the upper edges 366 and maintain the desired liquid level of the chemicals, the materials in the various compartments 354 to 364 inclusive. Drain valves 378 communicate with the various compartments 354 to 364 inclusive and are disposed for draining these compartments to drin old and used fluid therefrom which may also be drained into the hereinbefore described used liquid storage tanks via drain tubes 380 communicating with the valves 378, all as shown best in FIGS. 1 and 2 of the drawings.

It will be seen that the developer tank 344 is elongated and horizontally disposed above the developer tank 120 and that the tank 344 is provided with a delivery or outlet opening 382 through which developed pictures are delivered by means of one set of the nip rolls 346 and 348. The delivery opening 382 constitutes a light trap tunnel 384 which communicates with the outside of the housing at 386 whereat the customer or the operator receives the finished pictures which have been developed from the film 101, originally inserted through the arm receiving openings 52 and 54 hereinbefore described.

As shown in FIG. 22, a developer tank 390 is a modification of the tank 120 and the preferred form of the invention as far as the developer tank means is concerned.

This tank 390 receives liquid chemicals through the conduit 140 and outlets 142 and is provided with drain conduits 392 which are valve controlled, all as hereinbefore described relative to the drains 168 in the tank 120.

The tank 390 is thus designed to hold liquid chemicals therein and adapted to be filled and drained with a fresh batch of chemicals each time a strip of film is passed through the tank in a similar manner to that hereinbefore described.

Figure 23:
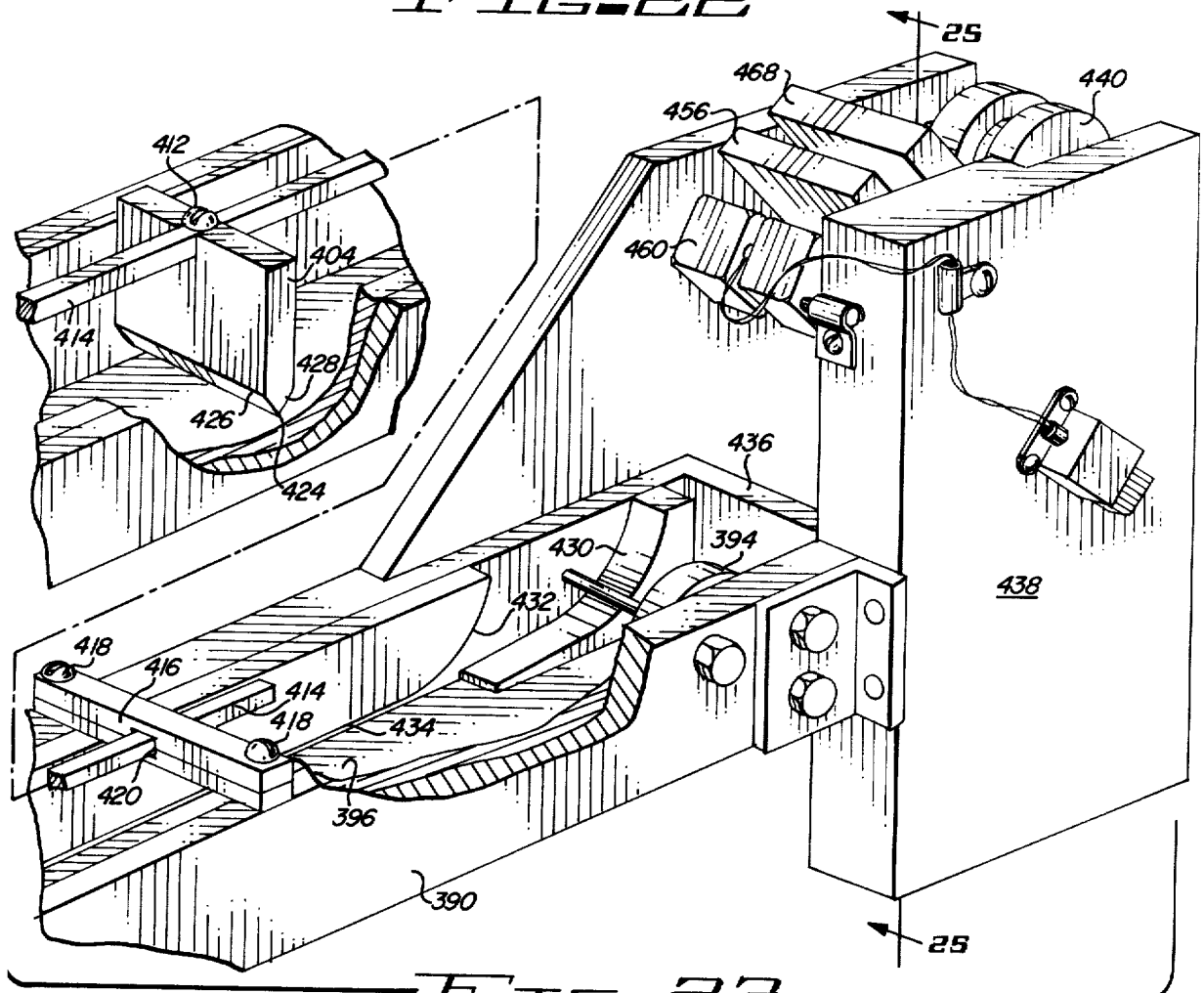
FIG. 23 is an enlarged fragmentary perspective view taken generally from line 23—23 of FIG. 22.
Figure 24:
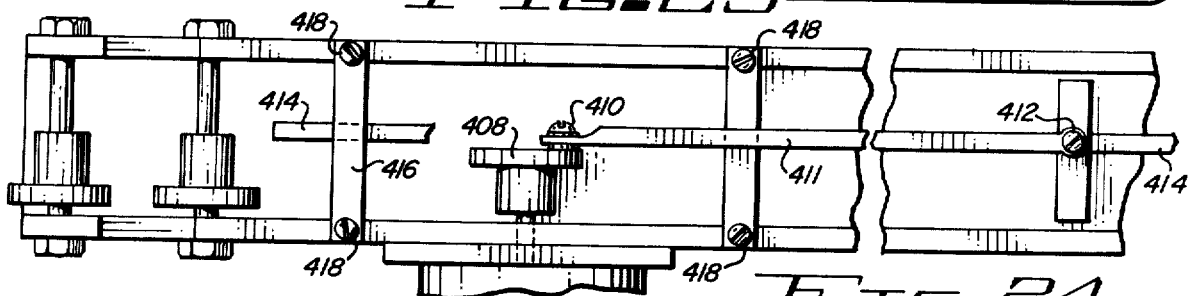
FIG. 24 is an enlarged fragmentary plan sectional view taken from the line 24—24 of FIG. 22.

The tank 390 at its inlet end is provided with a guide roller 394 over which film and transport tape passes. This roller 394, as shown in FIG. 23 of the drawings, is provided with a peripheral portion which guides film into close proximity with the bottom 396 of the tank and a similar roller 398 near the outlet end of the tank 390 is provided with a peripheral portion adapted to guide the film 400 in close proximity to the inner bottom portion 396 of the tank 390.

A take out roller 402 is disposed at the output end of the tank 390 to guide the film 400 as well as the tape 100 into the inlet opening 164 of the processing tank 166 as hereinbefore described.

It will be seen that the rollers 394 and 398 thus dispose the film 400 in close proximity to the bottom 396 as the film is transported through the tank 390 by means of the tape 100 hereinbefore described.

A plurality of liquid chemical paddles 404 are moveably mounted in the tank 396 to operate directly above the film 400 and to agitate liquid chemicals therein to insure that full contact of the chemicals is made during the movement of the film 400 therethrough and also to substantially stir the chemicals so that the entire batch of liquid chemicals will be capable of acting on the film rather than the usual boundary layer contact which only causes reaction on a boundary layer of the liquid relative to the surface of the film.

In FIGS. 22, 24, 27 and 28, as well as FIG. 23 means is shown for moving the paddles 404 forward and backward in directions of a double ended arrow 406 shown in FIG. 22 of the drawings.

This means includes a motorized crank wheel 408 having a crank pin 410 coupled to a connecting rod 411 which is pivoted at 412 with an actuating bar 414 by means of a pivot bearing 416, all as shown best in FIGS. 22, 24, 27 and 28. The bar 414, as shown best in FIG. 23, is reciprocally mounted in guide mechanisms 416 which are secured to upper edges of the tank 390 by means of screws 418. The bar 414 is slideably mounted in openings 420 in the guide members 416 and the paddles 404 are secured to the bar 414 by means of screws similar to the pivot bearing screw 412. This screw is provided with a screwthreaded portion 422 screwthreaded in the upper edge of the respective paddle 404. Thus, all of the paddles 404 are secured to the bar 414 in this manner. Each paddle 404 is provided with a lower V-shaped edge 424 having upwardly diverging portions 426 and 428 which are adapted to force liquid chemicals downwardly toward the film 400 when these paddles are moved in opposite directions as indicated by the arrow 406. Thus, the entire batch of chemicals in the tank 390 in each instance is fully agitated and caused to make efficient chemical contact with the film 400 and thus it is possible to use a relatively small batch of liquid chemicals very efficiently in developing the film 400 as it moves in close proximity to the lower inner portion 396 of the tank 390.

In the inlet end of the tank 390, as shown best in FIG. 23, a film guide 430 is provided with a downwardly directed concave radius substantially matching the periphery of the roller 394 on which film is guided to a position wherein a lower edge of the film is disposed between a complimental guide 432 which is provided with a lower edge 434 adjacent the bottom 396 of the tank 390 so as to insure that the film will move in a position in close proximity to the bottom 396 below the lower edges 424 of the paddles 404.

Figure 25:
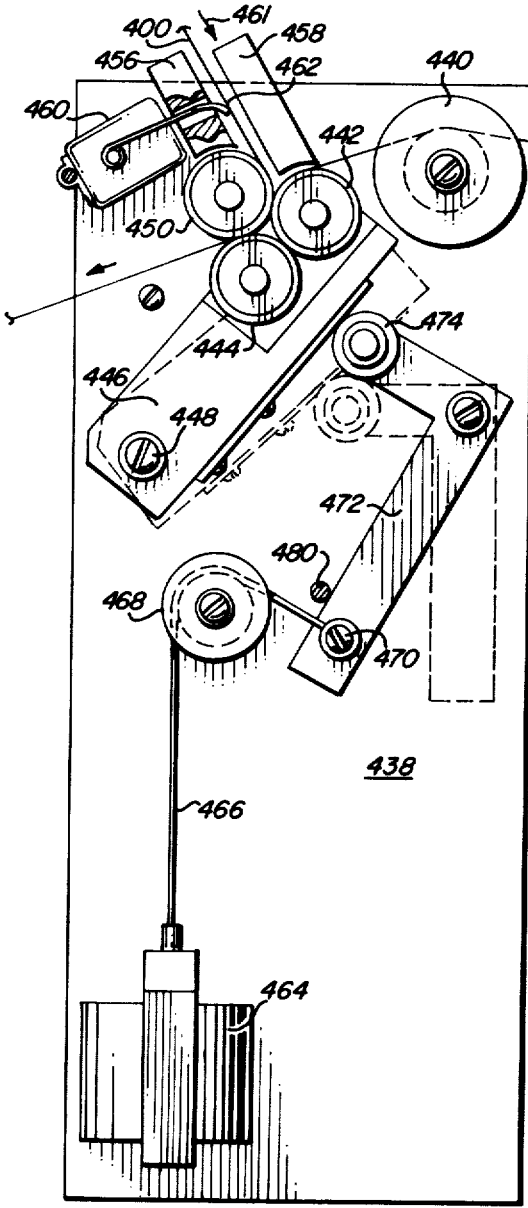
FIG. 25 is a fragmentary sectional view taken from the line 25—25 of FIG. 23.
Figure 26:
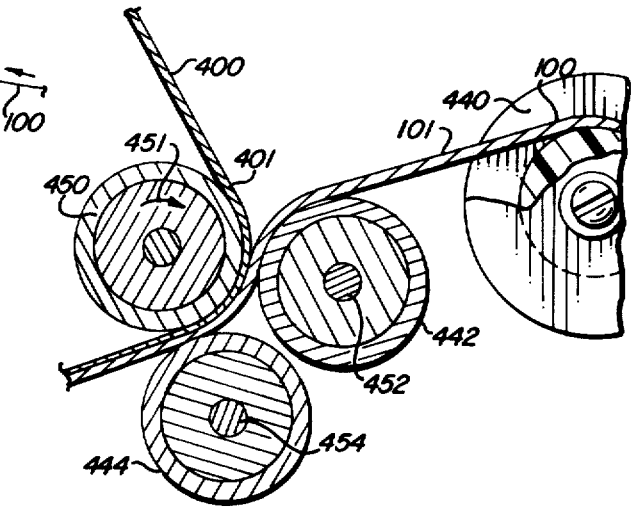
FIG. 26 is an enlarged fragmentary sectional view showing portions of the mechanism as illustrated in FIG. 25 on an enlarged scale.

Coupled to the inlet end 436 of the tank 390 is a frame structure 438 which supports film and tape input mechanism as shown in FIG. 25. This mechanism comprises a roller 440 adapted to feed the adhesive tape 100 hereinbefore described into proximity with the periphery of the roller 442 and the periphery of the roller 444, both of which are mounted on a carrier 446 which is pivoted at 448 on the frame 438 such that the peripheries of the rollers 442 and 444 may be moved into close proximity with the periphery of a stationary roller 450 which is rotatably mounted on the frame 438 and it will be seen that the peripheries of the rollers 442 and 444 engage the roller 450 at its periphery in spaced relation such that the tape 100 and the film 400, as shown in FIG. 25 are pressure wrapped together around an arcuate portion of the periphery of the roller 450 for approximately 60 to 90 degrees so as to insure intimate engagement of the adhesive surface 101 of the adhesive tape 100 with the marginal edge portion 401 of the film 400. The details of this mechanism shown in FIG. 25 are shown on a large scale in FIG. 26; the rollers 442 and 444 being mounted on respective shafts 452 and 454 carried on the pivoted member 446.

The frame 438 carries a pair of spaced guides 456 and 458 between which the film 400 is inserted inwardly in the direction of an arrow 461 shown in FIG. 25 of the drawings and a microswitch 460 is provided with a pivoted actuating arm 462 projecting between the guides 456 and 458 and is adapted to be contacted by the film 400 whereby the switch 460, when actuated, starts the entire electrical system of the machine including the take up roller 104 which pulls the transport tape 100 through the machine.

Additionally, the switch 460 activates a solenoid 464 which retracts a cable 466 over a roller 468 carried by the frame 438 and the cable 466 is attached by a fixture 470 to a bell crank 472 which carries a cam roller 474 which pivots the member 446 and the rollers 442 and 444 into close proximity with the roller 450 so as to force the tape 100 at its adhesive surface 101 into close contact and adhesive contact with the marginal surface or edge 401 of a film 400. It will be seen that the tape at its adhesive surface 101 is caused to be wrapped around the periphery of the roller 450 for a distance as indicates by double ended arrows 451 in FIG. 26 which may approximate 60 to 90 degrees and in this manner the tape is rolled successively between the rollers 442 and the roller 450 and the roller 444 and the roller 450 and maintained in tension therebetween such that the entire area of the tape and film as represented by the arrows 451 are maintained in substantially pressure tight and tension contact so as to insure a full and efficient bond or adhesive connection of the tape 100 with the marginal portion 401 of the strip of film 400.

Thus, when the film 400 is inserted between the guide bars 456 and 458, the switch arm 462 is caused to be moved and activate the switch 460 which energizes the solenoid 464 and applies pressure of the rollers 442 and 44 against the roller 450 as hereinbefore described. At the same time, the switch 460 energizes the tape take up roll 104 and therefore applies tension on the tape through the machine as hereinbefore described to transport the film 100 into the developer tank 390 as hereinbefore described.

As shown in FIG. 25, it will be seen that a stop pin 480 carried by the frame 438 stops the actuation of the bell crank lever 472 to attain precise contact disposition between the rollers 442 and 444 relative to the roller 450.

In operation, the aggitator means in the tank 390 provides for efficient usage of small amounts of liquid chemicals which are introduced through the manifold 140 for each new batch of film and are drained from the tank 390 through the drains 392 after each batch of film has passed through the tank.

Due to the use of a small amount of liquid chemicals, the aggitating paddles 404 fully aggitate the liquid and cause all areas of the liquid charge to contact the film 400 so that the film is fully developed without using only a boundary layer of the liquid in the tank. Additionally, the mechanism disclosed in FIG. 25, as hereinbefore described, insures that the adhesive surface 101 of the tape 100 is fully and firmly adhesively engaged with the marginal edge 401 of the film 400, as hereinbefore described.

In operation, the agitator means in the tank 390 as shown in FIGS. 29 to 31 inclusive, a plurality of film developer tanks are arranged in series in order to save time which may elapse between the entrance of one strip of film in the developer of the invention and the entrance of a next successive strip of film therein. It will be understood that the time required to develop film depends upon the chemistry involved and that the use of a series of developer tanks, as shown in FIG. 29, permits the operator of the machine of the invention to start a first strip of film through the developing tank series and allow the strip of film to pass out of a first tank whereupon a subsequent piece of film may be inserted in the first tank while the previously inserted strip of film is being processed in the second tank to complete the processing and to subject the first strip of film to a sufficient amount of chemical reaction to fully develop. In this manner, the total time required to develop film is substantially greater than the time lapse from the insertion of a first strip of film in the machine and the insertion of a successive or second strip of film into the machine.

As shown in FIG. 29, and FIG. 31, a tank means 480 comprises a pair of tanks in series, namely tanks 482 and 484. The tank 482 having an entrance end 486 with a guide roller 488 therein; reference being made to FIG. 22 of the drawings wherein film enters the tank 390 over a roller 394 which substantially corresponds to the roller 488 shown in FIG. 29 as far as the introduction of film into the developer tank system is concerned.

Thus, film proceeding into the entrance 486 of the developer tank means 480 passes from the nip rolls 444 and 450 and proceeds over the roller 488 around the periphery thereof and through guide slots 490 in opposite sides of the first tank 482. The film then proceeds over the periphery of a roller 492 near the opposite end of the developer tank 482, and then the film proceeds upward over a guide roller 494 which is over and above a partition 496 at an end of the tank 482 opposite to the inlet end 486 hereinbefore described. A chemicals inlet conduit 498 is adapted to supply fresh chemicals then to the tank 482 and an outlet 500 is adapted to drain used chemicals out of the tank 482, all as hereinbefore described in connection with the supply and draining of chemicals from the previously described developer tanks of the invention.

After a strip of film passes over the roller 494, it passes under a roller 502 and proceeds through the developer tank 484 to a position under a roller 504 as shown in FIG. 29 of the drawings, and then the film passes upwardly and over a roller 506 which guides the film out of the tank 484 and through an opening, such as the opening 164 disclosed in FIG. 22 and as hereinbefore described. Thus, film is pulled through the tanks 482 and 484 which are in series with each other, and the film is pulled through these tanks in a manner similar to that hereinbefore described wherein tape is adhesively secured to the marginal edge of the film by means of the rollers 442, 454 and 450 as hereinbefore described.

Figure 27:
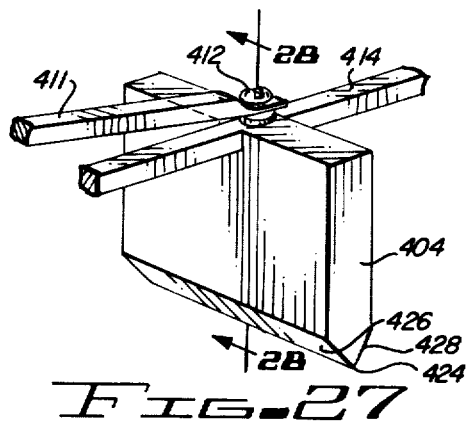
FIG. 27 is an enlarged fragmentary perspective view of one of the aggitator paddles in the developer tank as shown best in FIGS. 22 and 24.
Figure 28:
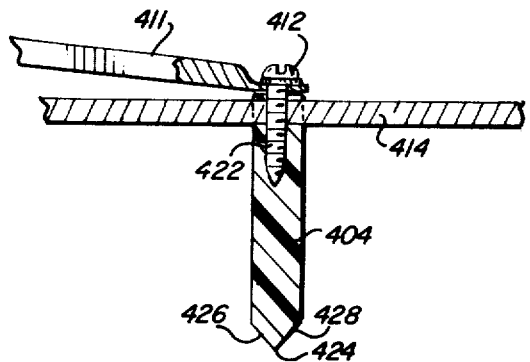
FIG. 28 is a fragmentary sectional view taken from the line 28—28 of FIG. 27.

As shown in FIG. 29 of the drawings, an aggitator motor 508 operates a crank wheel 510 shown best in FIG. 30, and this crank wheel 510 actuates an actuating arm 512 which moves a series of paddles 514 similar to the paddles 404 hereinbefore described in connection with FIG. 22 and FIGS. 27 and 28. Thus, the chemicals are aggitated over the film as it passes through the slotted guides 490 in the bottom portion of each respective tank 482 and 484, which are in series with each other. Another agitator operating motor 516 operates a crank disc 518 to move a connecting rod 519 which actuates a series of paddles 520 backwardly and forwardly in the tank 484 in a similar manner to the operation of the paddles 514 disclosed in FIG. 31 of the drawings.

In operation, both tanks 482 and 484 are supplied fresh chemicals through tubes, such as the tubes 498 shown in FIG. 31 of the drawings, or tubes 380 shown in FIG. 22 of the drawings, and such supply of liquids is controlled by suitable valves such as the valves 378 shown in FIG. 22. Additionally, the outlet 500 in the tank 482 and a similar outlet in the tank 484 provides for the draining of used chemicals from these tanks and for each strip of film processed or passed through each respective tank, fresh chemicals are supplied and the used chemicals are drained away.

It will be appreciated that the machine of the invention may be used in areas where people are waiting for their film to be processed and strips of film may be entered into the inlet end 486 of the tank 480. Each time a strip of film passes therefrom and the total time required to run film through the developer is dependent upon the passage of the strip of film through both tanks 482 and 484; but since they are separate, the total time required for subjecting the film to the developer is divided into two components of time and therefore the time which elapses between the entrance of one strip of film and the successive strip of film is only half of the amount of time that it takes to totally process the film in the developer and therefore, the series of tanks of the invention permit the operator to successively load separate strips of film into the machine with a minimum of time lapse therebetween and thus, productivity of the machine is greatly increased, as will be appreciated from the foregoing description of the series tank means disclosed in FIGS. 29, 30 and 31 of the drawings.

It will be appreciated that the developer and printer of the invention is capable of processing film and making prints therefrom within a time period ranging from 30 minutes to an hour and that the compactness of the overall facility including the various pieces of equipment in the housing 50 permits this facility to be used in various areas such as department stores and the like to hold customers in the area while they wait for their pictures to be developed. Thus, during shopping times, pictures may be developed and printed from film affording a convenience to the customer and also combining shopping time with the waiting for photographic service as provided by the machine of the invention.

It will be obvious to those skilled in the art that various modifications may be resorted to without departing from the spirit of the invention.

I claim:

1. In a photo developer and printer the combination of: a housing having a darkroom interior; film transport means in said darkroom interior of said housing; means traversed by said film transport means for developing film in said housing; printing means communicating with said film transport means and disposed in said housing and adapted to photographically print pictures from developed film; a film input compartment in said darkroom interior of said housing; said film transport means having a film receiving end in said input compartment; said housing having hand receiving openings communicating with the interior of said compartment; flexible light trap sleeves in said compartment surrounding said hand receiving openings and adjacent said receiving end of said film transport means; whereby human hands may be projected through said hand receiving openings from the outside of said housing and into said light trap sleeves in said compartment for inserting undeveloped film into said film receiving end of said film transport means; said housing having a film outlet opening for delivering developed film from said film transport means to the exterior of said housing; and a photo print outlet opening in said housing for delivering photo prints from said printer to the exterior of said housing.

2. The invention as defined in claim 1, wherein: a developer tank in said darkroom interior of said housing is disposed adjacent said receiving end of said film transport means; said film transport means having an adhesive tape extending through said developer tank; said adhesive tape disposed adhesively to grip marginal edge portions of said film beyond the image area thereof; first tape guide rollers arranged in and up and down serpentine path in said developer tank; said developer tank having a plurality of sump portions in which some of said rollers are disposed; tape drive means engaging said tape and disposed to pull said tape through said developer tank; an electrical activating means disposed at said receiving end of said film transport means; said activating means engageable by film and adapted to energize said film transport means for pulling said tape through said developer tank; nip rollers at said receiving end of said film transport means; pressure means operable by said activating means for forcing said nip rollers together for squeezing said tape onto the marginal edge of said film as said tape and said film are pulled into said developer tank.

3. The invention as defined in claim 2, wherein: a source roll of said tape is disposed in said housing; and a take-up roll for receiving tape dispensed from said source roll is rotatably mounted in said housing; said tape moveable from said source roll through said developer tank and onto said take-up roll.

4. The invention as defined in claim 2, wherein: said developer tank is provided with a drain communicating with all of said sump portions; a drain valve communicating with said drain; each sump portion being downwardly sloped to each separate drain; fluid communication means interconnecting said sump portions to equalize fluid content therein; developer delivery and metering means disposed to conduct fresh fluid into said sump portion for each load of film carried thereinto by said film transport means; means for activating said drain valve and said delivery and metering means in rapid sequence for draining used developer and charging said sump portions with fresh developer after each batch of film has been pulled through said developer tank.

5. The invention as defined in claim 2, wherein: said developer tank is horizontally elongated; a horizontally elongated processer tank disposed below said developer tank; said developer tank having a tape and film outlet opening; said processing tank having a tape and film inlet opening; said tape extending through said outlet and inlet openings; said processing tank having a plurality of guide rollers disposed in an up and down serpentine path in said processing tank; said processing tank having separate compartments for bleach, water, fixer, water and stabalizer respectively; partitions between said separate compartments; said partitions having upper edges adapted to be above liquid levels in said compartments; some of said last mentioned guide rollers disposed in said lower portions of said compartments and some of said last mentioned guide rollers being above and generally straddling said upper edges of said partitions; means for maintaining substantially constant liquid levels in said compartments below said upper edges of said partitions; said processing tank having a tape and film outlet opening; a horizontally elongated dryer housing disposed below said processing tank; said dryer housing having a tape and film inlet opening adapted to receive tape and film from said outlet opening of said processing tank; said dryer housing having heated air inlet and outlet openings in opposite ends thereof; said dryer housing having a tape and film outlet opening; tape and film guide rollers in said dryer housing adjacent said tape and film inlet and said tape and film outlet openings in said dryer housing.

6. The invention as defined in claim 5, wherein: a tape and film stripper is disposed to receive film passing from said tape and film outlet opening of said dryer; said stripper provided with stripper guide means and a separate blade adapted to split said tape and film apart; a motor for driving said take-up roll; said take-up roll disposed to pull tape and film through said stripper; said guide means having a film receiving passage disposed to deliver film to a printer; a printer disposed to receive said film from said film receiving passage; a light projector intersecting said passage and disposed to project light through said film to a printer easel; a photo print paper supply roll adjacent said easel; means for intermittently driving said photo print paper relative to said easel for exposing said print paper to projections from said film by said light projector.

7. The invention as defined in claim 6, wherein: paper cut-off means is disposed adjacent said easel; said paper cut-off means comprising a motor having crank means attached thereto; a rectilinear guide means adjacent said crank means; rotary cutter blades moveably mounted on said guide means; and a connecting rod coupling said crank means and said guide means for causing said rotary blades to traverse said easel and cut off paper following the last exposure from said light projector relative to a batch of film carried through said passage means.

8. The invention as defined in claim 6, wherein: a horizontally elongated print developer tank is provided with a print paper receiving opening adapted to receive print paper from said easel; a plurality of separate liquid containing print developer compartments in said print developer tank; partitions between said last mentioned compartments; a serpentine path means adapted to guide said exposed print paper up and down progressively and into and out of said last mentioned compartments; and light trap means at said print outlet opening extending from the interior of said print developer tank to the outside of said first mentioned housing.

9. The invention as defined in claim 8, wherein: said print developer tank is disposed horizontally above said first mentioned developer tank.

10. The invention as defined in claim 6, wherein: said receiving passage extends beyond said light projector; and a second light trap means at said film outlet opening is disposed to deliver said film to the exterior of said first mentioned housing.

11. A horizontally elongated film developer tank having a receiving end provided with a receiving opening therein; film transport means extending through said opening; said film transport means having an adhesive tape extending through said opening and said developer tank; said adhesive tape disposed adhesively to grip marginal edge portions of film beyond the image area thereof and to pull said film through said tank; first tape guide rollers arranged in an up and down serpentine path in said developer tank; said developer tank having a plurality of sump portions in which some of said rollers are disposed; said tape drive means engaging said tape and disposed to pull said tape through said developer tank; a switch disposed at said receiving end of said film transport means; said switch engageable by film and adapted to energize said film transport means for pulling said tape through said developer tank; a pair of nip rollers at said receiving end of said film transport means; pressure means operable by said switch for forcing said nip rollers together for squeezing said tape onto the marginal edge of said film as said tape and said film are pulled into said developer tank; said developer tank being provided with a drain communicating with all of said sump portions; a drain valve communicating with said drain; each sump portion being downwardly sloped to said drain; fluid communication means interconnecting said sump portions to equalize said fluid contents therein; developer delivery and metering means disposed to conduct fresh fluid into said sump portions for each load of film carried thereinto by said film transport means; means for activating said drain valve and said delivery and metering means in rapid sequence for draining used developer from said sump portions and charging said sump portions with fresh developer after each batch of film has been pulled through said developer tank.

12. The invention as defined in claim 2, wherein: said nip rollers comprising a stationary roller and a pair of moveable rollers adapted to make peripheral contact with said stationary rollers; said nip rollers being spaced apart and engageable with said stationary roller a substantial number of degrees around the periphery thereof so as to feed an adhesive transport tape and film together such that the film and tape are forced together and engaged at two different positions about the peripheral portion of the stationary roller so as to provide substantial contact and pressure for forcing the adhesive transport tape into adhesive contact and bonding relationship with the marginal edge of film passing between the stationary roller and the pair of moveable rollers; moveable means pivotally mounting said pair of moveable rollers to move into and out of contact with said stationary roller and electrically operable means adapted to move said moveable member and said pair of moveable rollers into firm contact with said stationary roller.

13. The invention as defined in claim 2, wherein: said developer tank is provided with means for transporting film into close proximity with the bottom portion of said tank; a plurality of aggitator paddles disposed in said tank and reciprocally moveable back and forth therein; said aggitator paddles having portions adapted to move in close proximity to the bottom of said tank and to film being transported therein adjacent to said bottom.

14. The invention as defined in claim 12, wherein: said developer tank is provided with means for transporting film into close proximity with the bottom portion of said tank; a plurality of aggitator paddles disposed in said tank and reciprocally moveable back and forth therein; said aggitator paddles having portions adapted to move in close proximity to the bottom of said tank and to film being transported therein adjacent to said bottom.

15. The invention as defined in claim 13, wherein: said aggitator paddles are provided with generally V-shaped lower edges having upwardly diverging surfaces adapted to aggitate liquid in adjacent relationship to film moving in a lower portion of said developer tank.

16. The invention as defined in claim 12, wherein: slot defining means is disposed to feed film into a position between said stationary nip roll and said pair of moveable rollers; switch means projecting into the path of film adjacent said rollers whereby said switch is actuated when said film is inserted between said stationary roller and said moveable rollers; roller means for guiding adhesive tape into position over one of said moveable rollers; a solenoid coupled to said switch and adapted to be activated thereby; a lever coupled to said solenoid; a pivoted member carrying said pair of moveable rollers; and said pivoted member actuated by said lever for forcing said pair of moveable rollers into intimate contact with said stationary roller.

17. The invention as defined in claim 13, wherein: a series of said developer tanks are disposed successively to receive film therein to reduce total time required between the entrance of one strip of film and the subsequent entrance of another strip of film in said machine; said series of developer tanks aligned with each other; and guide means disposed to guide a strip of film to move progressively from one tank to the next one in said series.

* * * * *